US008663377B2

(12) United States Patent
Klots et al.

(10) Patent No.: US 8,663,377 B2
(45) Date of Patent: *Mar. 4, 2014

(54) METHOD FOR CHANGING COLOR OF SUBSTRATE COATING BY APPLICATION OF STIMULUS

(75) Inventors: Timothy D. Klots, Glensdale, WI (US); David D. Schatz, Racine, WI (US)

(73) Assignee: BASF Corporation, Florham Park, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/444,458

(22) Filed: Apr. 11, 2012

(65) Prior Publication Data

US 2012/0219706 A1 Aug. 30, 2012

Related U.S. Application Data

(62) Division of application No. 12/648,637, filed on Dec. 29, 2009, now Pat. No. 8,168,266, which is a division of application No. 10/980,461, filed on Nov. 3, 2004, now Pat. No. 7,717,992.

(51) Int. Cl.
| | | |
|---|---|---|
| B05D 5/00 | (2006.01) | |
| B05D 3/02 | (2006.01) | |
| C09D 11/00 | (2006.01) | |
| C08F 4/00 | (2006.01) | |
| C08F 251/00 | (2006.01) | |
| C08F 253/00 | (2006.01) | |
| C08F 255/00 | (2006.01) | |
| C08F 257/00 | (2006.01) | |
| C08F 259/00 | (2006.01) | |
| C08F 261/00 | (2006.01) | |

(52) U.S. Cl.
USPC ............ 106/31.65; 106/31.27; 106/31.6; 525/523; 525/273; 525/261; 525/262; 427/557; 427/331; 427/372.2

(58) Field of Classification Search
USPC ......... 427/331, 372.2, 557; 106/31.65, 31.27, 106/31.6; 525/253, 273, 261, 262
See application file for complete search history.

(56) References Cited

U.S. PATENT DOCUMENTS

| | | | | |
|---|---|---|---|---|
| 3,967,034 A | * | 6/1976 | Meadus et al. | ................ 428/323 |
| 3,968,319 A | | 7/1976 | Mani et al. | |
| 4,074,482 A | * | 2/1978 | Klahr | ........................... 52/171.3 |
| 4,243,569 A | | 1/1981 | Koleske et al. | |
| 4,880,465 A | | 11/1989 | Loria et al. | |
| 4,935,469 A | | 6/1990 | Akasaki et al. | |
| 4,972,000 A | | 11/1990 | Kawashima et al. | |
| 5,053,441 A | | 10/1991 | Biale | |
| 5,106,813 A | * | 4/1992 | Hoshino et al. | ............... 503/207 |
| 5,219,943 A | | 6/1993 | Akasaki et al. | |
| 5,340,495 A | | 8/1994 | Mulcahy et al. | |
| 5,683,500 A | | 11/1997 | Kawasumi et al. | |
| 6,001,922 A | | 12/1999 | Clark et al. | |
| 6,063,849 A | | 5/2000 | Morris et al. | |
| 6,239,193 B1 | | 5/2001 | Cheng et al. | |
| 6,329,446 B1 | | 12/2001 | Sacripante et al. | |
| 6,337,131 B1 | | 1/2002 | Rupaner et al. | |
| 6,347,866 B1 | | 2/2002 | Sunderrajan et al. | |
| 7,717,992 B2 | | 5/2010 | Klots et al. | |
| 8,168,266 B2 | | 5/2012 | Klots et al. | |
| 2003/0171517 A1 | | 9/2003 | Johnson et al. | |
| 2003/0176534 A1 | | 9/2003 | Chung et al. | |
| 2004/0005453 A1 | | 1/2004 | Leyrer et al. | |
| 2004/0010080 A1 | | 1/2004 | Hutter et al. | |
| 2004/0037960 A1 | | 2/2004 | Suzuki et al. | |
| 2004/0234709 A1 | | 11/2004 | Ishida et al. | |
| 2004/0288182 | | 11/2010 | Klots et al. | |
| 2010/0288182 A1 | * | 11/2010 | Klots et al. | .................... 116/207 |

FOREIGN PATENT DOCUMENTS

| | | |
|---|---|---|
| EP | 0 071 071 | 2/1983 |
| EP | 0 402 768 | 12/1990 |
| EP | 1 609 827 | 12/2005 |
| JP | 2002-30113 | 1/2002 |
| WO | WO 97/19993 | 6/1997 |
| WO | WO 03/008199 | 1/2003 |
| WO | WO 03/093542 | 11/2003 |

OTHER PUBLICATIONS

Alfrey, Jr., Turner; Bradford, E.B. and Vanderhoff, J.W.: Journal of the Optical Society of America, Optical Properties of Uniform Particle-Size Latexes, vol. 44, No. 8 (1954), pp. 603-609.
Alince, B. and Lepoutre, P.: Journal of Colloid and Interface Science, Light-Scattering of Coatings Formed from Polystyrene Pigment Particles, vol. 86, No. 1(1990), pp. 182-187.
Berns. Roy S.; Principles of Color Technology, Colorants Chap. 5, pp. 131-139. Date unknown.
Buehler, Christopher S.; Caruthers, James M.; Franses, Elias I.: Light Scattering Theory from Monodisperse Spheroidal Particles in the Rayleigh-DeBye-Gans Regime, J. Chem. Phys.vol. 92(1), 1990, pp. 140-156.
Debnath, N.C. and Kotkar, D.D.: Theoretical Studies of Light Scattering Power (1998).
DuPont Titanium Technologies, Titanium Dioxide for Coatings, pp. 1-26 (date unknown).
Egen, Marc and Zentel, Rudolf: Tuning the Properties of Photonic Films from Polymer Beads by Chemistry, Chem Mater., (2002), 14, 2176-2183.
Ellis, William H.: Solvents, (1986) pp. 7-10.
Franses, E. I.; Scriven, L.E.; Miller, W.G. and Davis, H.T.: JAOCS, Interpreting the Appearance of Dispersed Systems; I. Model Dispersions of Polymer Latex Microspheres, vol. 60, No. 5 (1983), pp. 1029-1038.

(Continued)

Primary Examiner — William Phillip Fletcher, III
(74) Attorney, Agent, or Firm — Foley & Lardner LLP

(57) ABSTRACT

A method that includes applying a color enhancing composition to a substrate and drying the color enhancing composition, where the color enhancing composition includes a carrier fluid; chromatically selective scattering particles having a particle size distribution as measured by (weight average diameter)/(number average diameter) of less than or equal to 1.1; and an absorber of visible light.

10 Claims, 6 Drawing Sheets

(56) References Cited

OTHER PUBLICATIONS

Gugliotta, Luis M., Vega, Jorge R. and Meira, Gregorio: Journal of Colloid and Interface Science, Latex Particle Size Distribution by Dynamic Light Scattering; Computer Evaluation of Two Alternative Calculation Paths, (2000) vol. 228, pp. 14-17.

Knappich, Rainer; Burri, Peter; Lohmuller, Gerold and Hugener, Peter; Tappi Journal, Wet and Dry Coating Structure of Calcium Carbonate Pigments with Narrow Particle Size Distribution, vol. 83, No. 2 (2000), pp. 91-98.

Lee, Billy: Coatings and Ink, Paint and Coatings Industry, The Effect of $TiO_2$ Particle Size on Coatings Properties, (1998), pp. 82-90.

Maron, Samuel H.; Pierce, Percy E. and Elder, Max E.: Journal of Colloid Science, Determination of Latex Particle Size by Light Scattering—III. Minima and Maxima in Angular Dependence of Intensity, vol. 18 (1963) pp. 391-399.

Masalov, V.M.; Aldushin, K.A.; Dolganov, P.V. and Emel'Chenko, G.A.: Physics of Low-Dimensional Structures, 5/6 (2001) pp. 45-54.

McClements, David Julian: Current Opinion in Colloid and Interface Science; Colloidal Basis of Emulsion Color, vol. 7 (2002), pp. 451-455.

Nai-Ning, Wang: World Congress on Particle Technology 3, A Novel Light Scattering Energy Spectrum Method for Particle Size Analysis, Ch. 63, pp. 1-8.

Notice of Allowance issued for U.S. Appl. No. 10/980,461 mailed Nov. 5, 2009.

Office Action issued in Canadian Patent Application No. 2,596,423 and dated Feb. 20, 2012.

Prishivalko, A.P.: Journal of Applied Spectroscopy, Investigation and Optimization of the Covering Power and Coloristic Properties of Paint Coatings of Complex Composition, vol. 64, No. 1 (1997), pp. 94-100.

Sedlacek, Blahoslav: Collect. Czech. Chem. Commun., Light Scattering Size Estimation of Nearly Monodisperse Spherical Particles in the Multivalued Region: A Reminiscence, vol. 54 (1989), pp. 1276-1290.

Seiner, Jerome A.; Ind. Eng. Chem. Prod. Res. Dev., Polymer Coatings Section, Microvoids as Pigments, A Review, vol. 17, No. 4 (1978), pp. 302-317.

Sinitskii, Alexander S. and Tret'Yakov, Yuri D.: Synthesis and Optical Properties of Silica Photonic Crystals.

vanTent, A. and Nijenhuis, K.: Journal of Colloid and Interface Science, Turbidity Study of the Process of Film Formation of Polymer Particles in Drying Thin Films of Acrylic Latices, vol. 150, No. 1 (1992), pp. 97-114.

vanTent, A. and Nijenhuis, K.: Progress in Organic Coatings, Turbidity Study of the Process of Films of Aqueous Acrylic Dispersions, vol. 20 (1992), pp. 459-470.

Williams, Gordon C.: Circulars, National Paint, Varnish and Lacquer Assoc.; Scientific Sec. (1941), No. 629, pp. 437-445.

International Search Report and Written Opinion issued in PCT/US2005/037003 and mailed on Feb. 2, 2006.

International Preliminary Report on Patentability issued in PCT/US2005/037003 on May 8, 2007.

\* cited by examiner

METHOD FOR CHANGING COLOR OF SUBSTRATE COATING BY APPLICATION OF STIMULUS

CROSS-REFERENCE TO RELATED APPLICATIONS

This application is a divisional application of U.S. patent application Ser. No. 12/648,637, filed Dec. 29, 2009 (now U.S. Pat. No. 8,168,266), which is a divisional of U.S. patent application Ser. No. 10/980,461, filed Nov. 3, 2004 (now U.S. Pat. No. 7,717,992) the entire contents of which are incorporated herein by reference, for any and all purposes.

FIELD OF THE INVENTION

This invention relates to color enhancing compositions comprising a chromatically selective scatterer and an absorber of visible light, and to methods of using these compositions for enhancing, changing and concealing the color and/or tone of materials such as printing inks, coatings and paints.

BACKGROUND OF THE INVENTION

Color is one of the most important aspects of printing inks and paints. Printing inks are used for generating images and text on a variety of consumer and industrial goods. A primary function of the image and text is to identify and differentiate the printed object. The value of image and text can be directly related to the quality of the image including its color. One of the primary purposes of paints is also to provide a specific color to the underlying substrate. The value of a paint can also be directly related to its ability to provide a specific color.

Nearly all printing inks and paints contain three basic ingredients, a colorant, a binder and a carrier fluid. The colorant may be a pigment or a dye. The binder is used to fix colorant on a substrate and to impart end use properties such as water and chemical resistance. The carrier fluid may be water, an organic solvent or a mixture of water and organic solvent. Printing inks and paints often contain other additives to impart specific properties. For example, surfactants may be used to improve wetting of the substrate, bases such as amines may be used to control the pH of the ink and extender pigments may be used to impart bulk to a paint.

The color of a printing ink and paint is primarily derived from the pigments or dyes used as colorants. Color strength is a measure of the ability to impart color. In the case of inks and paints, color strength is mostly a function of the amount of pigment or dye contained in the ink or paint. There is a need to formulate inks and paints which have adequate color strength with the minimum amount of pigment or dye. One reason for reducing the amount of pigment or dye is that these ingredients are costly. Other reasons for reducing the amount of pigment or dye contained in inks and coatings are due to environmental hazards associated with these ingredients. Recycling of printed materials such as newspaper, magazines, brochures, packaging materials, and the like is done to reduce the amount of waste sent to land fills. During the process of recycling, printed materials are subject to various processes including removal of inks. Removal of colored species such as pigments and dyes is necessary as the value of recycled material is also related to its color. For example, recycled paper with no color can find greater use and therefore can have higher value than colored recycle paper. A reduction in the amount of pigments or dyes present in printing inks would be beneficial to obtaining recycled materials with no color.

Another reason for reducing the amount of colorant in inks is related to the need to use recycled paper and paperboard in a number of applications. The use of recycled paper is made in order to conserve natural resources and to reduce cost. However, additional processing is required in order to achieve a print quality on recycled paper which is comparable to that on fresh stock. Some of the additional processing is needed in order to bleach the recycled stock. White paper is desired for better print quality. However, a color composition which is able to hide the color of recycled paper would eliminate the need for bleaching and other processing of recycled paper.

One approach to producing colored inks and coatings without the use of coloring agents, such as pigments, has been to include sub-micron particles, and specifically microspheres, as scatters in the ink or coating. It is known in the theory of light scattering that size of the scattering sites has an influence on the wavelength of the light that is scattered. This phenomenon is seen when the size of the scattering site approaches the wavelength of the incident light. Under such circumstances smaller scattering sites preferentially scatter shorter wavelengths and larger scattering sites preferentially scatter longer wavelengths.

Hollow microspheres have been made in order to control the hue of white or non-pigmented ink-jet inks. For example, U.S. Pat. No. 4,880,465 (Loria et al) teaches a non-pigmented ink suitable for use in ink jet printing. The ink comprises a resin component, hollow microspheres, and a suitable carrier vehicle. The hollow microspheres each contain a central void region filled with a liquid capable of diffusing through the walls of said microsphere and have an inside diameter from about 0.1 to about 0.5 micron and an outside diameter from about 0.4 to about 1 micron. Loria et al further teach that upon drying the ink formulated with these microspheres forms a coating laden with microvoids which effectively scatter light to produce an opaque image. It is also taught that the microspheres which do not contain the microvoid are not suitable.

European Patent No. EP 1544804 (Finley et al) teach a non-pigmented ink composition suitable for use in ink jet printing comprising a carrier liquid and a multi-modal blend of polymer particles, wherein each mode has a particle size of between 0.2 to 1.5 micron, at least one mode is a hollow microsphere polymer and at least two modes differ in particle size by at least 0.1 micron. Finely et al teach that the blending of two or more hollow microsphere components having very different cavity sizes or shapes makes it possible to accurately select any desired hue characteristic of a white ink, from a bluish hue to a pure white.

SUMMARY OF THE INVENTION

The present invention provides color enhancing compositions based on chromatically selective scattering particles (CSSPs) with a narrow particle size distribution and an absorber of visible light. In some embodiments the CSSPs may be solid or hollow polymeric particles or inorganic particles and the absorber may be a pigment or dye.

These compositions are useful for enhancing, changing or concealing the color and/or tone of materials such as printing inks, coatings and paints. Using the color enhancing compositions provided herein, ink formulations may be fine-tuned to deliver a color image, tone, or printing with specific shades and hues, for a given set of application conditions. In certain embodiments the amount and sizes of the CSSPs in the compositions may be tailored to alter the color of an ink, paint or coating in a controlled manner.

The amount of colorant required to formulate a printing ink, coating or paint of a certain color is reduced by the use of these color enhancing compositions. This provides a cost benefit due to lower cost of the color enhancing compositions. Also, compositions containing lesser amounts of colorants are preferred due to environmental hazards associated with the colorants. Additionally, enhanced color compositions can be used on lower cost paper such as recycled paper and paperboard in order to conceal or improve the appearance of the underlying substrate.

One aspect of this invention provides a color enhancing composition comprising CSSPs with a particle size distribution (PSD) of less than about 1.1 and an absorber of visible light, where PSD=(weight average diameter of the CSSPs (Dw))/(number average diameter of the CSSPs (Dn)). In certain embodiments the Dw of the CSSPs is between about 170 and 360 nanometers (nm). Within this size range, sub-ranges may be selected to order to enhance a particular color. In certain embodiments, the ratio of $\lambda_{max}$/Dw, where $\lambda_{max}$ is the wavelength maximum in the visible light transmission or reflectance spectrum of the absorber, is between 1.8 and 2.2.

The color enhancing compositions include a medium surrounding the CSSPs, referred to as a "surrounding medium." This surrounding medium simply refers to any medium that fills the volume between the CSSPs. The index of refraction of the surrounding medium is sufficiently different from the index of refraction of CSSPs that scattering of visible light takes place at the interface between the CSSPs and the surrounding medium. Typically the ratio of the index of refraction of the CSSPs to that of the surrounding medium is at least about 1.2. Polymers, including resins and binders, are examples of surrounding media. Air or even vacuum may also be considered a surrounding medium where voids exist between the CSSPs.

Still another aspect of this invention provides a method for enhancing the color of a material by adding CSSPs and an absorber of visible light to the material. For example, the CSSPs and absorber may be added to a composition containing a carrier fluid and a binder to provide a colored ink or paint.

Another aspect of this invention provides a method for enhancing the color of printing indicia on a substrate by applying CSSPs and an absorber of visible light to the surface of the substrate. The CSSPs and the absorber may be applied together as a mixture or may be applied separately in different coating layers. For example, the CSSPs and absorber may be applied to recycled paper or paperboard in order to improve the appearance of the surface thereof.

Still another aspect of this invention provides a method for enhancing the color of a material by adding CSSPs and an absorber of visible light to the material such that the color of the material differs from that of a the same material containing achromatic, non-selective scattering particles with a PSD of greater than 1.1 by at least five $\Delta E$, where $\Delta E$ is calculated from the chromatic and lightness values of the material, as described below.

Still another aspect of this invention provides a method for changing the color of a substrate by applying a composition containing CSSPs and an absorber of visible light to the substrate, allowing the composition to dry to provide a first color on the substrate and applying a stimulus to at least partially coalesce the CSSPs to provide a second color on the substrate. In certain embodiments the stimulus is a coalescent. In these embodiments the coalescent may be a cosolvent which may be supplied as a layer over the dried composition.

The coalescent may be applied by spraying or any other suitable means for delivering a liquid over the dried composition. In other embodiments the stimulus is heat. In these embodiments a color enhancing composition comprising CSSPs and an absorber of visible light changes color after application to a substrate, drying and subsequent heating to a high temperature. In certain embodiments these compositions change color when heated to a temperature of at least about 300° F. This includes embodiments where the compositions change color when heated to a temperature of at least about 350° F. and further includes embodiments where the compositions change color when heated to a temperature of at least about 400° F. In some such embodiments, the CSSPs in the composition comprise crosslinked emulsion polymers.

Another aspect of this invention provides a method for concealing indicia on an underlying substrate by applying a composition comprising CSSPs and an absorber of visible light over the indicia and allowing the composition to dry, wherein the color of the dried composition matches the color of the indicia on the substrate. Methods for revealing the concealed indicia are also provided. This may be accomplished by changing the color of the applied composition. The change in color may be permanent or temporary. In the former case, the color change may be the result of the partial or total coalescence of the CSSPs in the composition. Coalescence may be brought about by heating or adding a coalescent to the applied composition. Alternatively, a temporary color change may be accomplished by filling voids between the CSSPs with a medium having a refractive index that differs from the refractive index of the CSSPs by no more than about 1.1. The indicia may be re-concealed by removing the medium from the voids.

Another aspect of this invention provides color compositions useful for formulation of printing inks, paints and coatings with special effects. In certain embodiments the special effect compositions have a pearlescent or opalescent effect. Colored inks with special effects such as a pearlescence or opalescence may be formulated by mixing at least one colorant, at least one binder, CSSPs and at least one carrier fluid with other additives selected to impart properties needed for inks. In certain embodiments the special effect compositions are colored inks and coatings that undergo a color change to provide black inks and coatings.

Another aspect of this invention provides color composition comprising CSSPs and an absorber of visible light which are useful for security inks and coatings. In certain embodiments these inks and coatings can be recognized by measurement of their color using a colorimeter.

DETAILED DESCRIPTION

Figure 1:
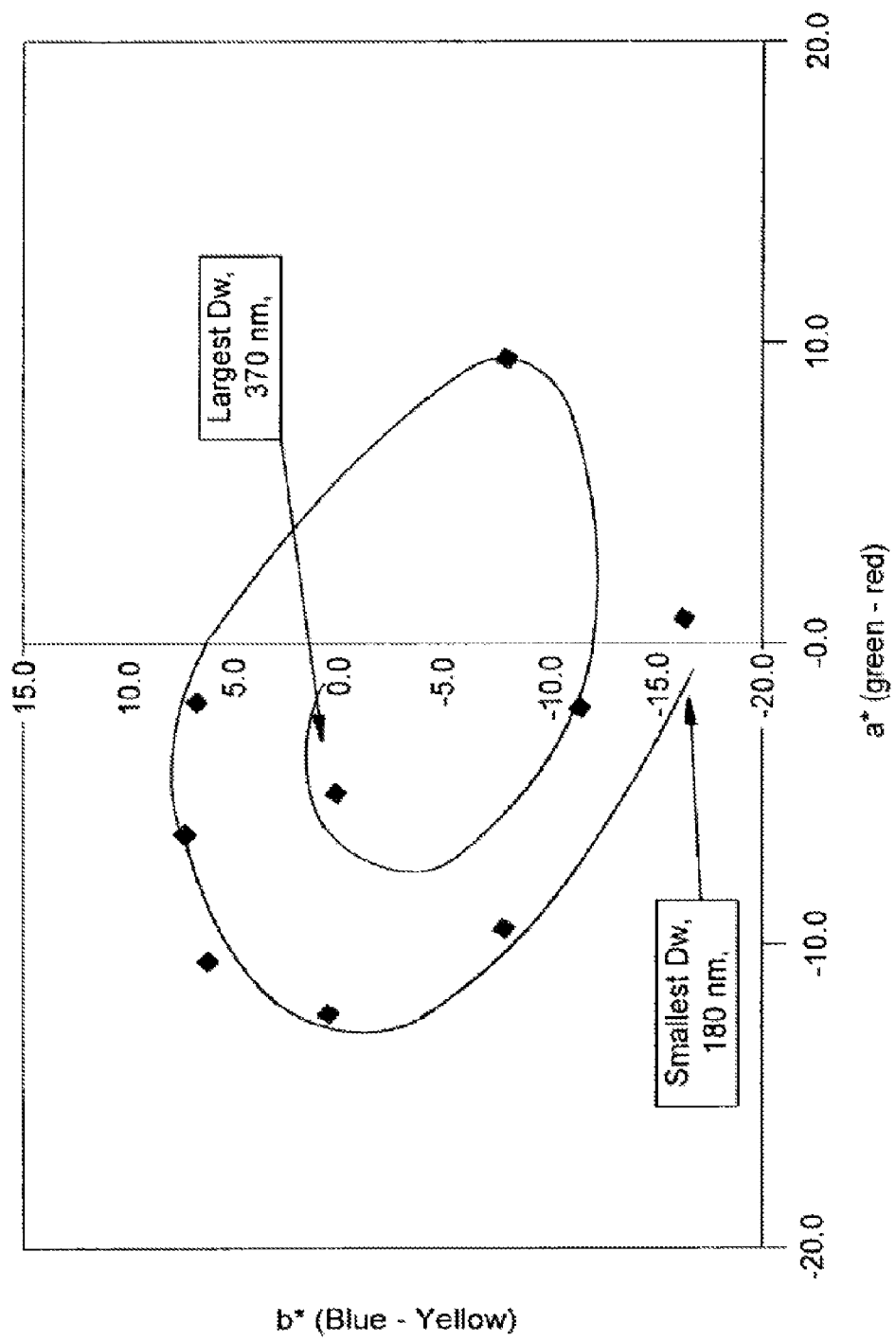
FIG. 1 shows a graph of b* versus a* for the inks of Example 26.

The present invention is based on the inventors' surprising and unexpected discovery that a color enhancing composition comprising CSSPs and an absorber of visible light can be used to enhance, change and/or conceal the color of materials, such as inks, paints and coatings, and substrates, such as paper and paperboard. As a result of the color enhancement brought about by the use of CSSPs in combination with visible light absorbers lesser amounts of colorants are needed in order to formulate inks and coatings with specific color and color strength. In addition to providing enhanced color in a variety of materials, these color enhancing compositions may be used to improve the color quality of printing on un-bleached or recycled paper and paperboard, to provide a color change upon heating or by addition of a coalescent and to provide inks and coatings with special colors and colored effects such as pearlescence.

The present invention provides color enhancing compositions based on CSSPs with a narrow particle size distribution and an absorber of visible light.

Without wishing or intending to be bound to any particular theory of the invention, the inventors believe that the color enhancement provided by the CSSPs is due, at least in part, to the void volume between the CSSPs. For example, nearly monodisperse particles of the CSSPs may form a close-packed array with a void volume in the dried film of approximately 26%. This void volume is filled with air or another suitable medium to provide a surrounding medium having a refractive index that is sufficiently different from the refractive index of the CSSPs to produce noticeable light scattering at the interface between the voids and the CSSPs.

For the purposes of this disclosure scattering particles are considered to be chromatically selective if they preferentially scatter a portion of the visible light such that they modify the incident spectral power distribution. The CSSPs may be made from a variety of materials, including both organic and inorganic materials.

In some embodiments the CSSPs are polymeric particles. Such particles include, but are not limited to, particles polymerized from vinyl aromatic monomers (e.g., styrene), (meth)acrylic acid and/or various derivatives of (meth)acrylate monomers. Suitable monomers include, but are not limited to styrene, (meth)acrylic acid, 2-hydroxyethyl acrylate and 2-ethylhexyl acrylate. In certain embodiments of this invention, polymeric CSSPs with narrow PSD are made by emulsion polymerization. Emulsion polymerization is a well known technique based on free radical initiated polymerization of monomers in an aqueous medium in the presence of surface active agents. A variety of monomers can be used for the preparation of emulsion particles. A number of techniques for generation of free radical initiators are also known. Emulsion polymers with narrow PSD and specific Dw can be made by the appropriate selection of process variables. These emulsion polymers can be made by a seeded or unseeded process. Further, a batch, semi-continuous or continuous process can be used. Emulsion polymers may also be crosslinked in order to improve their resistance properties. The selection of monomers for emulsion polymers is made on the basis of refractive index, glass transition temperature (Tg), polarity and other properties. These principles are known to persons of ordinary skill in the art. For Example, the glass transition temperature (Tg) of a polymer can be calculated from the glass transition temperature of its component monomers by use of the following equation.

$$1/Tg = \Sigma(w_i/Tg_i)$$

where $w_i$ is weight fraction of monomer and $Tg_i$ is glass transition temperature of the homopolymer of this monomer. The values of Tg for homopolymers can be found in the Polymer Handbook, Third edition, Brandrup and Immergut, editors, John Wiley and Sons, New York, 1989, Ch VI, pp. 213-258. Therefore, a person skilled in the art can use the above equation in order to formulate a polymer with specific Tg.

It is also known to persons of ordinary skill in the art that the refractive index of a polymer is an additive function of the refractive indices of homopolymers of monomers contained in the polymer. The following equation can be used to calculate the refractive index of a polymer.

$$n = \Sigma(v_i n_i)$$

In this equation, $n_i$ is the refractive index and $v_i$ is the volume fraction of the monomer present in the polymer. Values of refractive indices for a variety of polymers are given in the Polymer Handbook, Third Edition, Brandrup and Immergut, editors, John Wiley and Sons, New York, 1989, Ch VI, pp. 451-461.

Crosslinked emulsion polymers for use in this invention can be made in a variety of ways using methods known to persons of ordinary skills in the art. In certain embodiments crosslinked emulsion polymers can be prepared by copolymerization of polyolefinically unsaturated monomers with other monomers described above. Examples of polyolefinically unsaturated monomers are diacrylates and dimethacrylates of alkanediols of about 1 to 8 carbon atoms, such as glycol diacrylate and dimethacrylate, butane-1,4-diol diacrylate and dimethacrylate, hexane-1,6-diol diacrylate and dimethacrylate, octane-1,8-diol diacrylate and dimethacrylate, as well as divinylbenzene, diallyl phthalate, butadiene and trimethylolpropane triacrylate or trimethacrylate, and pentaerythritol triacrylate or tetraacrylate. The polyolefinically monomers are used in an amount of from 0.5 to 15% by weight, based on the total amount of monomers to be polymerized.

In certain other embodiments, crosslinked emulsion polymers can be prepared by copolymerization of crosslinking monomers with other monomers described above. Examples of crosslinking monomers include epoxy (usually glycidyl) and hydroxyalkyl (usually C1-C12, e.g. hydroxyethyl) methacrylates and acrylates, as well as keto or aldehyde functional monomers such as acrolein, methacrolein and vinyl methyl ketone, the acetoacetoxy esters of hydroxyalkyl (usually C1-C12) acrylates and methacrylates such as acetoacetoxyethyl methacrylate and acrylate, and also keto-containing amides such as diacetone acrylamide.

In other embodiments the CSSPs are inorganic particles. Such particles include, but are not limited to, silica particles, glass particles and titanium dioxide particles.

The chromatically selective scattering particles may be solid particles, hollow particles or a combination thereof. Suitable hollow particles include microspheres with voids. Examples of suitable microspheres include polymeric, glass and ceramic microspheres. The polymeric microspheres may be made from a variety of polymers, however, preferred microspheres are composed of styrene-acrylic copolymers. The dimensions of the void provided by the microspheres are desirably between 170 and 360 nm and the size distribution (i.e., Dw/Dn) of the void is desirably no more than 1.1. Suitable microspheres for use in the present color enhancing compositions include those described in U.S. Pat. No. 4,089,800, the entire disclosure of which is incorporated herein by reference.

Surprisingly it has been discovered that compositions based on small CSSPs with a narrow particle size distribution and an absorber of visible light may be used to enhance the color of materials such as inks, paints and coatings in a controlled manner. Other uses of this invention are provided below.

In some embodiments of the invention the CSSPs have a particle size distribution (i.e., Dw/Dn) of no more than about 1.1. This includes embodiments where the CSSPs have a particle size distribution of no more than about 1.01 and further includes embodiments where the CSSPs have a particle size distribution of no more than about 1.001. Preferably, the CSSPs also have a weight average diameter (Dw) from about 170 to 360 nm. As used herein, the term "diameter" refers the length of the largest internal diameter of a particle.

One advantage of the invention is ability to match a CSSP with an absorber, e.g., a pigment or dye, such that a desired chromatic enhancement occurs. The absorber by itself may be described according to simple subtractive mixing laws. Under these conditions, it would have a characteristic absorbance or transmission spectrum, if diluted and recorded in a clear medium, such that maxima and minima may be found versus wavelength of light. More importantly, should a second absorber be added, any further changes in the power spectral distribution can be predicted based on additivity of the absorption constants, the concentration of each absorber and the path length of the propagating light. Of course, the perceived color of this system actually depends on the human chromatic interpretation of the transmitted light. For example, if the liquid or clear film is blue, it is this color because most or all of the wavelengths (λ) greater that 480 nm are being absorbed, while some or all of the light for λ below 480 nm is allowed transmission. For most common coloring applications involving coatings, inks and colored opaque objects, complex subtractive mixing law must be used to describe the chromatic attributes of a material, which enable prediction of the reflectance properties. Thus, scattering by the absorber as well as any non-absorbing scattering centers (i.e., white pigment) must be accounted for in addition to radiative absorption. Simplified rules and equations for this more common scenario are given by Kubelka-Munk theory, which states that reflectance (internal) at each wavelength follows:

$$R_\lambda = 1 + (K/S)_\lambda - [(K/S)^2_\lambda + 2(K/S)_\lambda]^{1/2}$$

where K and S are the absorption and scattering coefficients, respectively. For simple subtractive mixing, only the absorption coefficients ($K_\lambda$) are important; for complex subtractive mixing, it is actually the ratio of absorption to scattering $(K/S)_\lambda$ at each wavelength. Importantly, K/S is approximately additive for each ingredient. A slight modification of this equation is used to derive the actual external reflectance for a sample. It can be readily seen from the above equation, that variations in S with λ, as well as K, could influence, the power spectral distribution of a material; i.e., its color. Thus, a system comprising a low S with a high K would be more effective and "complimentary," than one with both large S and K. The reverse would also be true. An inherent problem of most common coloring pigments, both inorganic and organic, is lack of control of particle size. Therefore, there is little ability to influence the value S. Usually, the particle size is chosen to maximize the $K_\mu$. It has been surprisingly discovered by the present inventors that the reflectance properties of a mixture governed by complex subtractive mixing laws can be influenced by particle size and PSD and CSSPs so that color development is enhanced.

The primary enhancement of a colored system occurs when the Dw of the CSSPs is approximately 0.4 to 0.5 times the maximum in the reflectance spectrum of the colored material. Surprisingly, the $S_\lambda$ properties of CSSP can be selected to raise the overall $(K/S)_\lambda$ value for the material where the $K_\lambda$ value for the absorber is high, and lower it where the absorber has a small $K_\lambda$ value. Accordingly CSSPs with particle sizes of about 175-210 nm enhance blue pigments and colorants. Likewise, CSSPs with particle sizes of about 210-235 nm enhance green pigments and colorants. CSSPs with particle sizes of about 235-265 nm enhance yellow pigments and colorants. CSSPs with particle sizes of about 265-295 nm enhance red pigments and colorants. In all of these cases, one would expect the color of the ink to be dominated by the colorant, but surprisingly the use of the CSSPs, matched to the colorant as described, can significantly enhance the color compared to that when the colorant is in a matrix with a broad, ill-defined, particle size distribution.

Equally unique, when CSSPs with the particle sizes described above are mixed into an indiscriminant absorber, such as a black colorant, a dominant color is produced in significant chromatic strength according to the wavelength ranges described above. These black colorant-based color enhancing composition are useful as printing inks or coatings.

The CSSPs in the color enhancing compositions are surrounded by a surrounding medium which is simply the medium that occupies the volume between the particles. There should be sufficient refractive contrast between the CSSPs and the surrounding medium to provide chromatically selective scattering. Typically, it is sufficient that the ratio of the refractive indices (RI) of the two phases is greater than about 1.2. In some embodiments, the surrounding medium may be a polymer, including a resin or a binder. In other embodiments the surrounding medium is air contained in voids that are present between the particles when the compositions are dried into a film. In still other embodiments, the surrounding medium may actually be defined by empty voids (i.e., a vacuum) between the particles. In still other embodiments the surrounding medium may be composed of both a binder, such as a polymer or resin, and air-filled voids or vacuum. When the surrounding medium is air or a vacuum the particles should not completely coalesce during or after the application and drying of the composition on a substrate, so that the voids or vacuum remain present when the composition is dried into a film.

The color enhancing compositions of the present invention may be added to ink formulations to enhance the color of the inks. The formulation of colored inks may be done by mixing the CSSPs, at least one absorber of visible light, at least one binder, at least one carrier fluid and, optionally, other additives selected to impart properties needed for inks. In certain embodiments, the absorber of visible light is a colorant (e.g., pigments or dyes) selected to impart a specific color to the ink. The amount of colorant, CSSPs and binder are selected to impart a specific color and other properties to the inks. Suitable additives include, but are not limited to, biocides, humectants, pH adjusting agents and defoamers.

The color enhancing compositions may be provided in the form of a dispersion, suspension or solution of CSSPs and visible light absorbers in a suitable liquid medium, such as water, an organic solvent, or a mixture thereof. Depending on the intended application for the composition, the ratio of components may be selected to provide a composition suitable for application as an ink, including an ink jet ink, or other similar coating. By way of illustration only, in some embodiments color enhancing composition designed for use as inks or coatings will include about 10 to about 80 weight percent (wt. %), and preferably about 20 to about 70 wt. % CSSPs. The amount of visible light absorber depends on the type of light absorber. By way of illustration only, for organic light absorbers such as organic dyes, the amount will be about 0.1 to about 40 wt. %, and preferably about 0.2 to about 30 wt. % visible light absorber. Again by way of illustration only, for inorganic colorants such as pigments, the amount will be about 1 to about 50 wt. %, and preferable about 2 to about 40 wt. % visible light absorber. In certain embodiments where the color enhancing compositions are used in an ink formulation the amount of visible light absorber is greater than 0.05 percent by weight of the formulation.

The color enhancing compositions of the present invention may be printed, coated or otherwise applied to a variety of substrates and allowed to dry into a film. Drying can be under ambient conditions or by application of heat, IR, radio frequency or other means.

In some embodiments, the color enhancing compositions are applied in the form of a mixture of the CSSPs and the at least one visible light absorber, while in other embodiments the color enhancing compositions are applied as separate layers containing the CSSPs and the absorber. In one embodiment, the absorber is applied to a substrate, and the CSSPs are applied over the absorber. A specific example of this embodiment is the use of black pigments for the absorber whereby a dominant color is produced. In another embodiment, the CSSPs are applied first, and the absorber is applied over the CSSPs. A specific example of this embodiment is the use of thinly coated metal as the absorber. For example, CSSPs applied over a suitable substrate can be metallized with aluminum or other suitable metal. Metallization is a well-known technique for making substrates for wrapping, etc. The process is described in "Mettalic Coatings", Kirk-Othmer Encyclopedia of Chemical Technology, Fourth ed., John Wiley & Sons, Inc., New York, 1995, pp. 228-291; the entire disclosure of which is incorporated herein by reference. In these embodiments the weight % of the absorber is at least 0.05 weight % of the total applied material.

Substrates onto which the compositions may be applied include, but are not limited to, paper and paperboard, glass, metal, plastic and rubber substrates.

The present invention also provides methods for using the color enhancing compositions. In one method, the color enhancing compositions are used to provide a particular color using less pigment without sacrificing color quality. Color is an aspect of an object described in terms of its hue, saturation and lightness and these characteristics are used to distinguish one color from another. Hue is an attribute associated with each of the dominant wavelengths, such as, red, yellow and blue, of a spectrum. Saturation pertains to relative purity, or the amount of white light mixed with a hue. High-saturation colors contain little or no white light. Hue and saturation, taken together, are called chromaticity. Lightness refers to intensity distinguished by the degree of shading.

Accordingly, a color may be characterized by its chromaticity and lightness. The most widely used system of specifying and classifying color was adopted in 1931 by the Commission Internationale de l'Eclairage (CIE), commonly called the International Commission on Illumination. The CIE system revised in 1976, employs a three dimensional "L", "a*" and "b*" chart in which "a*" and "b*" are planar chromaticity coordinates at right angles to one another and "L" is a lightness coordinate at right angle to the plane containing the chromaticity coordinates. In this chart "+a*" value corresponds to red hue, "−a*" value at a diametrically opposite end corresponds to green hue, "+b*" value corresponds to yellow hue and "−b*" value at a diametrically opposite end corresponds to blue hue. The lightness of color is measured along the "L" axis whereby a higher "L" value corresponds to light of increased intensity and a lower "L" value corresponds to light of decreased intensity. A low or negative "L" corresponds with a grayer, including black, color, while a high or positive "L" corresponds to a brighter, including white, color. Thus, by using this chart any color can be three dimensionally characterized by its chromaticity and lightness. For example, higher "b*" values represent more yellowish hues and lesser bluish hues and lower "b*" values represent more bluish hues and lesser yellowish hues.

The use of CSSPs in inks provides inks and other coatings with enhanced color in comparison to the color of inks and coatings containing an achromatic, non-selective scatterer. One benefit is that the amount of colorant required to attain a certain color is reduced. Inks with enhanced color are applied over paper or other suitable substrate and allowed to dry prior to measurement of color. The dried inks obtained in this manner show enhanced color by measurement of La*b* value of inks using an instrument such as a colorimeter. Various methods can be used for application of inks. For example, the inks can be applied by offset, flexographic, gravure, letterpress, screen printing, or ink-jet printing process.

The color enhancement achieved by incorporating the color enhancing compositions into ink and other coating formulations can be quantified by comparing L, a* and b* values measured with a calorimeter for inks and other coatings containing the color enhancing compositions and those containing an achromatic, non-selective scatterer. Specifically, the following equation may be used to measure color enhancement:

$$\Delta E=[(L-L_R)^2+(a^*-a_R^*)^2+(b^*-b_R^*)^2]^{1/2}$$

In certain embodiments, the color enhancing compositions provide a color enhancement as measured by $\Delta E$ of at least about 4. In other embodiments, a $\Delta E$ value of up to about 30 can be achieved with the color enhancing compositions of this invention.

In addition to enhancing color, the color enhancing compositions may be designed to undergo a change in color n response to a stimulus. Drying of inks under certain embodiments does not lead to coalescence of the CSSPs. However, in certain embodiments a change of color occurs upon coalescence or fusion of the CSSPs. The coalescence can occur by application of a stimulus. In some embodiments this stimulus is heat. Heat is applied to raise the temperature of the ink or other coating above the temperature required for coalescence of the CSSPs. In certain embodiments the color enhancing compositions do not change color unless heated above a certain temperature. As a result, the color of the ink or other coating can serve as a useful indicator of thermal exposure. In some embodiments, the color enhancing compositions change color when heated above 400° F. In certain other embodiments the color enhancing compositions change color when heated above 300° F. In some embodiments these color enhancing compositions comprise crosslinked emulsion polymers as CSSPs.

In certain other embodiments the coalescence of particles can be caused by addition of a coalescing agent to the ink. In some embodiments, the coalescing agent takes the form of a cosolvent in the ink compositions. Thus, coalescing agents may be used to cause a color change in the inks. The cosolvent can be selected on the basis of solubility parameters of the cosolvent and the binder present in the composition containing CSSPs. The selection of cosolvents on the basis of solubility parameter is taught by Ellis in Solvents (Federation of Societies for Coatings Technology, 1986) pp. 7-10, the entire disclosure of which is incorporated herein by reference. In some embodiments coalescing agent can be supplied as a layer on a dried ink composition by spraying or other suitable means for delivering a liquid to the dried ink composition.

In one embodiment, the color enhancing compositions are used to provide a color-changing black ink. In this embodiment, black inks with special color effects are formulated by mixing at least one black colorant, optionally a binder, CSSPs, and at least one carrier fluid and, optionally, other additives selected to impart properties and chromaticity needed for inks. In certain embodiments the CSSPs for use with these inks have a PSD of less than 1.1 and a Dw between 170 and 360 nm. The amounts of components are selected to obtain inks with specific color and other properties. Use of CSSPs in these black inks provides inks with special color effects. These effects are seen by visual observation of dried inks. The chromaticity of the dried black ink formula is dependent on the size of the CSSPs, the level of black pigment, and the properties of the surrounding medium. In this embodiment, the particle size of CSSPs determines initial color of the ink containing the black colorant. For example, the addition of CSSPs with particle sizes of between about 180 and 210 nm to a black ink provides a blue initial color, particle sizes of between about 210 and 230 nm provides a green initial color, particle sizes of between about 240 and 260 nm provides an pearlescent initial color, and particle sizes of between about 270 and 290 nm provides a red initial color, and so on. Upon application of heat or increase in temperature the CSSPs fuse or coalescence causing a change in color. The final color of all inks containing the CSSPs according to this embodiment of the invention is black. This embodiment has been illustrated with reference to black inks. However it can be used for obtaining colored inks with other special color effects.

Another aspect of color production is the fine-tuning of an ink formulation to deliver a color image, tone, or printing with specific shades and hues, for a given set of application conditions using CSSPs that enhance the color of an ink having a chromatically adjacent color. As an example, a red-enhancing CSSP can be used to modify a blue ink or a yellow ink but not a green ink. Traditionally fine-tuning color may have meant the use of multiple pigments in precisely controlled ratios and amounts, as well as adjustment of the pigment grind size. According to the present invention, it is possible to use CSSPs to accomplish these fine-tuning tasks. In this embodiment, the CSSPs are used, not to directly enhance the effect of the primary pigment, but to alter it in a controlled, predictable manner. This can be illustrated as follows. The whole gamut of blues are described as greenish-blue through solid blue to reddish-blue, but never a yellowish-blue. Use of CSSPs that are adjacent to a visible light absorber with respect to hue allows for the production, manipulation, and alteration of the primary color of an ink or coating in a small but predictable manner. For instance, in one embodiment, a blue pigment can be shaded to the green by the use of CSSPs with particle sizes selected on the basis of $\lambda_{max}$ of the primary color and the desired color effect. One benefit of this practice is in keeping the amounts of total pigment low and polymer resin high. Moreover, this embodiment offers the ink-formulator additional latitude by reducing the number of pigment (each of its own shade) for a particular color in its inventory.

Inks with enhanced color in accordance with the present invention are also useful for concealing or improving the appearance of the surface of an underlying substrate, such as paper or paper board. In this embodiment inks are formulated by mixing at least one colorant, at least one binder, CSSPs, at least one carrier fluid and, optionally, other additives selected to impart properties needed for inks. After application and drying, the enhanced color inks conceal the underlying surface so that the color of printed matter on a lower quality surface (e.g., paper or paperboard) is equivalent to that on a higher quality surface. In one embodiment the lower quality surface is a paper surface containing at least some amount of recycled paper or unbleached paper.

Another aspect of the invention provides methods of using a coating containing the color enhancing compositions to cover and conceal indicia on a substrate. The term indicia as used herein refers to any image, pattern, picture, text or the like that appears on the surface of a substrate. In these methods the indicia may be revealed by application of a stimulus, such as heat, or a coalescing agent, such as a cosolvent, to the coating. The stimulus does not affect the underlying indicia. To accomplish this, the indicia is applied to a substrate. The combination of CSSPs and absorber for use in the coating are chosen such that upon drying the expressed color of the coating matches the color of the indicia. As a result, when the indicia are coated with the color enhancing composition and the color enhancing composition is dried, the indicia are no longer apparent.

In one embodiment, the image or text is permanently revealed by the application of the stimulus. This may be accomplished by fusing or coalescing the CSSPs by stimuli such as heat and/or a coalescing agent, which eliminates voids or vacuum in the coating, alters the scattering properties of the coating, and allows the unchanged underlying indicia to become visible.

In another embodiment, the indicia are revealed upon application of a stimulus and hidden again upon removal of the stimulus. This may be accomplished by filling in the voids or vacuum with a medium having a refractive index that matches, or nearly matches, the refractive index of the CSSPs. A sufficiently close match will change the scattering characteristics of the coating enough to allow the indicia to become visible under conditions where they were not previously. Typically it is sufficient that the ratio of refractive indices of the CSSPs and medium is no more than about 1.1. Filling in the voids effectively eliminates light scattering from the formula, allowing the underlying image or text to be revealed. Upon removal of the medium by, for example, drying, the voids are re-introduced, and the indicia are hidden again.

In one embodiment the color enhancing compositions are composed of a combination of hollow sphere CSSPs and non-hollow sphere CSSPs of similar composition. Upon application of a solvent medium having a refractive index that matches or nearly matches the refractive index of the CSSPs (e.g., a solvent selected such that the ratio of refractive indices of the CSSPs and medium is no more than about 1.1), the voids contained within the hollow sphere CSSPs remain while the voids between the spheres are filled with the medium. As a result the scattering characteristics, and therefore the color, of the regions containing the hollow sphere CSSPs remain unchanged or substantially unchanged, while the scattering characteristics, and therefore the color, of the regions containing non-hollow sphere CSSPs change.

One variation on the methods of using a coating to cover and conceal indicia on a substrate is the use of CSSPs to hide white indicia without the use of the absorber. The indicia may be applied in white ink, such as a $TiO_2$-based ink formulation. This white ink is coated with CSSPs providing a coating, which in the dry state, matches the chromo of the ink. Upon application of a stimulus, the voids or vacuum between the CSSPs are eliminated, and the white text or image is revealed. These embodiments are useful for the formulation of security inks wherein the hidden image or text is used for identification.

Another aspect of the invention provides methods for utilizing the color enhancing compositions for security and identification purposes. In this method the color enhancing compositions may be used to mark an object. The identity or authenticity of the object may later be verified by determining whether the specific values of L a*b* imparted by the marking on the object actually match those expected from the color enhancing composition. For example, these values may be measured by an instrument such as a calorimeter.

The following non-limiting examples serve to further illustrate advantages of the disclosed invention.

EXAMPLES

Abbreviations:

The following abbreviations are used throughout the examples that follow: MAA=Methacrylic Acid; HEA=2-Hydroxyethyl Acrylate; ST=Styrene; EHA=2-Ethylhexyl Acrylate.

Measurements and Equipment:

The viscosity of emulsions was measured by a Brookfield Model DV-II+ viscometer. The spindle size and RPM used for these measurements is given. Particle size of emulsions was measured with a Capillary Hydrodyanamic Fractionation (CHDF) model 2000 from Matec Instruments. The values of number average diameter (Dn) and weight average diameter (Dw) are reported. The non-volatile content of emulsions was measured from the weight loss of an approximately 1 g size sample heated in an oven at 145° C. for 30 minutes. pH was measured with a pH meter.

Unless otherwise specified, amounts listed in the tables that follow are in grams (g).

Example 1

Styrene-Acrylic CSSPs with a Particle Size Distribution, (Dw/Dn), =289/287

This example provides a method for making substantially monodisperse styrene-acrylic CSSPs using an emulsion polymerization.

16.44 pounds (lbs.) of deionized water was added to an agitated, temperature controlled 13 gallon reactor. The reactor was heated to 82° C. A monomer mixture was made up in an agitated tank by blending 1.54 lbs. methacrylic acid, 1.70 lbs. hydroxyethyl acrylate, 15.48 lbs. of deionized water, 0.70 lbs. of a 75% solution of sodium dioctyl sulfosuccinate (AEROSOL OT-75), 45.37 lbs. styrene, and 5.40 lbs. 2-ethylhexyl acrylate. 7.0 lbs. of the monomer mixture made above was added to the reactor. 0.25 lbs. of ammonium persulfate was dissolved in 2.03 lbs. of deionized water, and this mixture was added to the reactor. The reactor Was maintained at 82° C. After 55 minutes (min.) the remaining monomer mixture was fed to the reactor at a constant rate over 150 minutes. 1.06 lbs. of deionized water was added to the monomer mixture tank and fed to the reactor. 0.10 lbs. of a 70% solution of t-butyl hydroperoxide was blended with 0.13 lbs. of deionized water, and this mixture was added to the reactor. 0.133 lbs. of isoascorbic acid was dissolved in 0.45 lbs. of deionized water and 0.16 lbs. of 28% ammonia solution in water. This mixture was fed to the reactor over approximately 20 min. The reaction was cooled to 49° C. Then 0.391 lbs. of a 50% sodium hydroxide solution in water was blended with 0.40 lbs. of deionized water and added to the reactor. 0.02 lbs. of a preservative containing approximately 15% 5-chloro-2-methyl-4-isothiazolin-3-one dissolved in water was blended with an additional 0.38 lbs. of deionized water and added to the reactor. 0.20 lbs. of an approximately 30% polyoxyalkylene polymer and 3% siloxane glycol copolymer (Dee Fo PI-35, Ultra Additives, Paterson, N.J.) in water was added to the reactor. 2.00 lbs. of a proprietary 18% solids styrene/acrylic/glycol/surfactant emulsion (AC-505, Aqueous Concepts, Tampa, Fla.) was then added to the reactor. 4.06 lbs. of deionized water was then added to the reactor. The reaction was filtered. The resulting emulsion had a non-volatile content of 55.5% by weight, a pH of 8.50, a viscosity of 428 centipoise as measured by a Brookfield type viscometer with spindle LV#2 at 30 rpm. Particle size was determined to be Dn=287 nm and a Dw=289 nm.

Example 2

Styrene-Acrylic CSSPs with a Particle Size Distribution, (Dw/Dn), =270/268

This example provides a method for making substantially monodisperse styrene-acrylic CSSPs using an emulsion polymerization. 17.47 lbs. of deionized water was added to an agitated, temperature controlled 13 gallon reactor. The reactor was heated to 75° C. A monomer mixture was made up in an agitated tank by blending 1.54 lbs. methacrylic acid, 1.70 lbs. hydroxyethyl acrylate, 15.48 lbs. of deionized water, 0.70 lbs. of a 75% solution of sodium dioctyl sulfosuccinate (AEROSOL OT-75), 45.37 lbs. styrene, and 5.40 lbs. 2-ethylhexyl acrylate. 7.0 lbs. of the monomer mixture made above was added to the reactor. 0.25 lbs. of ammonium persulfate was dissolved in 1.0 lbs. of deionized water, and this mixture was added to the reactor over 2 minutes. The reactor was maintained at 75° C. After 55 min. the remaining monomer mixture was fed to the reactor at a constant rate over 120 minutes. 1.06 lbs. of deionized water was added to the monomer mixture tank and fed to the reactor. 0.10 lbs. of a 70% solution of t-butyl hydroperoxide was blended with 0.13 lbs. of deionized water, and this mixture was added to the reactor. 0.133 lbs. of isoascorbic acid was dissolved in 0.45 lbs. of deionized water and 0.16 lbs. of 28% ammonia solution in water. This mixture was fed to the reactor over approximately 20 min. The reaction was cooled to 49° C. Then 0.391 lbs. of a 50% sodium hydroxide solution in water was blended with 0.40 lbs. of deionized water and added to the reactor. 0.02 lbs. of a preservative containing approximately 15% 5-chloro-2-methyl-4-isothiazolin-3-one dissolved in water was blended with an additional 0.38 lbs. of deionized water and added to the reactor. 0.20 lbs. of an approximately 30% polyoxyalkylene polymer and 3% siloxane glycol copolymer (Dee Fo PI-35, Ultra Additives, Paterson, N.J.) in water was added to the reactor. 2.00 lbs. of a proprietary 18% solids styrene/acrylic/glycol/surfactant emulsion (AC-505, Aqueous Concepts, Tampa, Fla.) was then added to the reactor. 4.06 lbs. of deionized water was then added to the reactor. The reaction was filtered. The resulting emulsion had a non-volatile content of 55.2%, a pH of 8.72, a viscosity of 558 centipoise as measured by a Brookfield type viscometer with spindle LV#2 at 30 rpm. Particle size was determined to be Dn=268 nm and a Dw=270 nm.

Example 3

Styrene-Acrylic CSSPs with a Particle Size Distribution, (Dw/Dn), =329/328

This example provides a method for making substantially monodisperse styrene-acrylic CSSPs using an emulsion polymerization. 17.47 lbs. of deionized water was added to an agitated, temperature controlled 13 gallon reactor. The reactor was heated to 78° C. A monomer mixture was made up in an agitated tank by blending 1.54 lbs. methacrylic acid, 1.70 lbs. hydroxyethyl acrylate, 15.48 lbs. of deionized water, 0.70 lbs. of a 75% solution of sodium dioctyl sulfosuccinate (AEROSOL OT-75), 45.37 lbs. styrene, and 5.40 lbs. 2-ethylhexyl acrylate. 7.0 lbs. of the monomer mixture made above was added to the reactor. 0.25 lbs. of ammonium persulfate was dissolved in 1.0 lbs. of deionized water, and this mixture was added to the reactor over 1 minute. The reactor was maintained at 78° C. After 55 min. the remaining monomer mixture was fed to the reactor at a constant rate over 120 minutes. 1.06 lbs. of deionized water was added to the monomer mixture tank and fed to the reactor. 0.10 lbs. of a 70% solution of t-butyl hydroperoxide was blended with 0.13 lbs. of deionized water, and this mixture was added to the reactor. 0.133 lbs. of isoascorbic acid was dissolved in 0.45 lbs. of deionized water and 0.16 lbs. of 28% ammonia solution in water. This mixture was fed to the reactor over approximately 20 min. The reaction was cooled to 49° C. Then 0.391 lbs. of a 50% sodium hydroxide solution in water was blended with 0.40 lbs. of deionized water and added to the reactor. 0.02 lbs. of a preservative containing approximately 15% 5-chloro-2-methyl-4-isothiazolin-3-one dissolved in water was blended with an additional 0.38 lbs. of deionized water and added to the reactor. 0.20 lbs. of an approximately 30% polyoxyalkylene polymer and 3% siloxane glycol copolymer (Dee Fo PI-35, Ultra Additives, Paterson, N.J.) in water was added to the reactor. 2.00 lbs. of a proprietary 18% solids styrene/acrylic/glycol/surfactant emulsion (AC-505, Aqueous Concepts, Tampa, Fla.) was then added to the reactor. 4.06 lbs. of deionized water was then added to the reactor. The reaction was filtered. The resulting emulsion had a non-volatile content of 55.2%, a pH of 9.01, a viscosity of 404 centipoise as measured by a Brookfield type viscometer with spindle LV#2 at 30 rpm. Particle size was determined to be Dn=328 nm and a Dw=329 nm.

Example 4

Styrene-Acrylic CSSPs with a Particle Size Distribution, (Dw/Dn), =327/326

This example provides a method for making substantially monodisperse styrene-acrylic CSSPs using an emulsion polymerization. 164.4 lbs. of deionized water was added to an agitated, temperature controlled 140 gallon reactor. The reactor was heated to 80° C. A monomer mixture was made up in an agitated tank by blending 15.4 lbs. methacrylic acid, 17.0 lbs. hydroxyethyl acrylate, 164.8 lbs. of deionized water, 7.0 lbs. of a 75% solution of sodium dioctyl sulfosuccinate (AEROSOL OT-75), 453.7 lbs. styrene, and 54.0 lbs. 2-ethylhexyl acrylate. 71 lbs. of the monomer mixture made above was added to the reactor. 2.52 lbs. of ammonium persulfate was dissolved in 20.3 lbs. of deionized water, and this mixture was added to the reactor. The reactor was maintained at 80° C. After 55 min. the remaining monomer mixture was fed to the reactor at a constant rate over 120 minutes. 10.6 lbs. of deionized water was added to the monomer mixture tank and fed to the reactor. 1.0 lbs. of a 70% solution of t-butyl hydroperoxide was blended with 1.33 lbs. of deionized water, and this mixture was added to the reactor. 1.33 lbs. of isoascorbic acid was dissolved in 4.5 lbs. of deionized water and 1.6 lbs. of 28% ammonia solution in water. This mixture was fed to the reactor over approximately 20 min. The reaction was cooled to 49° C. Then 3.91 lbs. of a 50% sodium hydroxide solution in water was blended with 4.0 lbs. of deionized water and added to the reactor. 0.2 lbs. of a preservative containing approximately 15% 5-chloro-2-methyl-4-isothiazolin-3-one dissolved in water was blended with an additional 0.38 lbs. of deionized water and added to the reactor. 2.0 lbs. of an approximately 30% polyoxyalkylene polymer and 3% siloxane glycol copolymer (Dee Fo PI-35, Ultra Additives, Paterson, N.J.) in water was added to the reactor. 20.0 lbs. of a proprietary 18% solids styrene/acrylic/glycol/surfactant emulsion (AC-505, Aqueous Concepts, Tampa, Fla.) was then added to the reactor. 20.6 lbs. of deionized water was then added to the reactor. The reaction was filtered. The resulting emulsion had a non-volatile content of 55.4%, a pH of 8.45, a viscosity of 364 centipoise as measured by a Brookfield type viscometer with spindle LV#2 at 30 rpm. Particle size was determined to be Dn=326 nm and a Dw=327 nm.

Example 5 and 6

Styrene-Acrylic CSSPs with Particle Sizes of About 350 nm

This example provides a method for making substantially monodisperse styrene-acrylic CSSPs having an average particle size near 350 nm. Two similar reactions were run with the following approximate procedure. 3511 lbs. of deionized water was added to an agitated, temperature controlled 2500 gallon reactor. The reactor was heated to 72° C. A monomer mixture was made up in an agitated tank by blending 308 lbs. methacrylic acid, 340 lbs. hydroxyethyl acrylate, 3086 lbs. of deionized water, 140 lbs. of a 75% solution of sodium dioctyl sulfosuccinate (Aerosol OT-75), 9074 lbs. styrene, and 1080 lbs. 2-ethylhexyl acrylate. 1420 lbs. of the monomer mixture made above was added to the reactor. 50.4 lbs. of ammonium persulfate was dissolved in 200 lbs. of deionized water, and this mixture was added to the reactor. This addition was followed by 85 lbs. of deionized water. The reactor was maintained at 72° C. After 60 min. the remaining monomer mixture was fed to the reactor at a constant rate over 130 minutes. 170 lbs. of deionized water was added to the monomer mixture tank and fed to the reactor. 20.0 lbs. of a 70% solution of t-butyl hydroperoxide was blended with 25 lbs. of deionized water, and this mixture was added to the reactor. 26.6 lbs. of isoascorbic acid was dissolved in 125 lbs. of deionized water and 32 lbs. of 28% ammonia solution in water. This mixture was fed to the reactor over approximately 20 min. The reaction was cooled to 49° C. Then a blend of 78 lbs. of a 50% sodium hydroxide solution in water, 40 lbs. of an approximately 30% polyoxyalkylene polymer and 3% siloxane glycol copolymer (Dee Fo PI-35, Ultra Additives, Paterson, N.J.) in water, 400 lbs. of a proprietary 18% solids styrene/acrylic/glycol/surfactant emulsion (AC-505, Aqueous Concepts, Tampa, Fla.), and 255 lbs. of deionized water was added to the reactor over 20 minutes. 4.0 lbs. of a preservative containing approximately 15% 5-chloro-2-methyl-4-isothiazolin-3-one dissolved in water was blended with an additional 76 lbs. of deionized water and added to the reactor. 573 lbs. of deionized water was then added to the reactor. The reactions were filtered. The resulting emulsion had a non-volatile content of 54.37 and 54.9%, a pH of 8.94 and 8.74, a viscosity of 234 and 354 centipoise as measured by a Brookfield type viscometer with spindle LV#2 at 30 rpm. Particle sizes were determined to be Dn=356 and 372 nm respectively, and Dw=357 and 375 nm respectively.

Example 7

Preparation of a Seed Latex for CSSP Growth

This example provides a method for making seed latex particles for CSSP growth. 696 grams (g) of deionized water was added to an agitated, temperature controlled 3000 ml reactor. The reactor was heated to 79° C. A monomer mixture was made up in an agitated tank by blending 21.0 g methacrylic acid, 22.6 g hydroxyethyl acrylate, 214 g of deionized water, 9.4 g of a 75% solution of sodium dioctyl sulfosuccinate (AEROSOL OT-75), 602 g styrene, and 72 g 2-ethylhexyl acrylate. 290 g of the monomer mixture made above was added to the reactor. 2.7 g of ammonium persulfate was dissolved in 7.5 g of deionized water, and this mixture was added to the reactor. This addition was followed by 10 g of deionized water. The reactor was maintained at 79-83° C. After 15 min. the remaining monomer mixture was fed to the reactor at a constant rate over 40 minutes. After the monomer feed, the reaction was held at for 60 min. The reaction was cooled, and 48 g of deionized water was added. The resulting emulsion had a non-volatile content of 43.02%, a pH of 2.12, a viscosity of 121 centipoise as measured by a Brookfield type viscometer with spindle LV#2 at 30 rpm. Particle size was determined to be a Dn=54 nm and a Dw=88 nm.

Examples 8-16

Styrene-Acrylic CSSPs Made with Seed Latex

This example provides a method for making CSSPs using a seeded process. The formulations for the emulsion CSSPs are shown in Table 1. The polymerization process used was conducted as follows: Item A in Table 1 was charged to a temperature controlled, agitated 1000 ml reactor and heated to the specified temperature in the Table 1. Mixture B was made up. 10% of mixture B was then added to the reactor. Item C was then added. Mixture D was made up and added. The reactor contents were held at reaction temperature for 55 minutes. Then the remaining mixture B was added over the specified time in Table 1. Item E was added. Then mixture F was added. The reaction was held for 5 min. Then mixture G was added over 3-20 minutes. After holding another 5 minutes, the reaction was cooled to 55° C. or lower. Then mixture H was added. Mixture I was then added, followed by Item J. The physical characteristics of the Examples are displayed in Table 2.

Example 17

Enhancing Coatings

A blue colored color enhancing composition was made up with the CSSP emulsion of Example 4; an emulsion optimized for blue color (17A) according to this invention, and Sun BFD 1121, a blue pigment available from Sun Chemical, Fort Lee, N.J. For comparison a composition (17B) was also made up with the CSSP emulsion of Example 5, which is not optimized for blue color. Two additional compositions (17C and 17D) were made up with the same CSSP emulsions and with addition of a third, low-$T_g$, film-forming emulsion (JONCRYL 82, Johnson Polymer LLC, Sturtevant, Wis.). The compositions were drawn down over a Lenetta N2A card with a #32 wire wound bar and dried to provide coatings on the cards. The reflectance over the white portion of the card was recorded with a Macbeth ColorEye 7000. Table 3 provides the formulations and calorimeter data for each of the coatings. As shown in the table, the CSSPs optimized for blue provide superior blue color enhancement.

Example 18

Pigment Reduction Based on CSSP Use

This example illustrates the reduction in pigment that may be achieved in inks that use color-optimized CSSPs compared to inks that do not include color-optimized CSSPs. Three blue inks were made up using Sun BFD 1121, a blue pigment available from SunChemicals, Fort Lee, N.J. The first used a CSSP emulsion not optimized for blue (Example 5). This sample was drawn down over a Lenetta 2A card with a #32 wire wound bar and dried. The L a*b* values over the white portion of the card were recorded with a Macbeth ColorEye 7000. Two more inks were made up from the CSSP emulsion of Example 3, an emulsion optimized for blue. These inks used less blue pigment and visually achieved a good match with the first ink by adding small amounts of black pigment (T-150-386, available from Wolstenholme International Ltd., Lancashire, England). These results demonstrate the potential for more economical inks. Table 4 provides the formulations, colorimeter data, and the approximate % dollar savings, based on reduced pigment usage, for each of the inks.

Example 19

Fine-Tuning Color with Color Enhancing Compositions

This example illustrates how the color or tint of a substrate may be fine-tuned using the present color enhancing compositions. In some red inks it is desirable to have a more violet tone for aesthetic reasons. This may be achieved using the teachings of the present invention without using additional pigments. Red inks were made with a CSSP emulsion optimized for blue (Example 4) and a CSSP emulsion not optimized for blue (Example 5). Two different pigment grinds were used to make the inks, Magruder LF6558, available from Magruder Color Co., Elizabeth, N.J. and Heucotech RS 1150, available from Heucotech Ltd. The inks were drawn down over a Lenetta 2A card with a #6 wire wound bar. The formulations for the inks are provided in Table 5. The appearance of Examples 19A and 19C, the inks made with the blue-optimized CSSPs, were more violet than their respective comparison samples, 19B and 19D which appeared red. The reflectance over the black portion of the card was recorded with a Macbeth ColorEye 7000. Table 5 shows the reflectance data at 450 nm. The corresponding reflectance spectra for the 350 nm to 590 nm range showed small peaks at approximately 450 nm (expressing blue color) for the 19A and 19C samples.

Example 20

Concealing and Revealing Indicia with Color Enhancing Compositions

A message was written on the white portion of a Lenetta 2A card with a permanent dark green pen, with color similar to that of the color enhancing composition of Example 26C below. The color enhancing composition of Example 26C was applied to the card with a #32 wire wound bar and dried to provide a coating with a dark green hue. The message was effectively concealed by the coating. The Lenetta card was placed in a 120° C. oven for approximately 10 seconds to coalesce the CSSPs in the coating. The message was clearly legible after the heat treatment.

Example 21

Concealing and Revealing Indicia with Color Enhancing Compositions

A message is written on the black portion of a Lenetta 2A card with a white $TiO_2$-based ink and dried. The CSSP emulsion of Example 6 is applied to the card with a #32 wire wound bar and dried to provide a white coating. The message is effectively concealed by the coating. The Lenetta card is placed in a 120° C. oven for approximately 10 seconds to coalesce the CSSPs in the coating. The message is clearly legible after this heat treatment.

Example 22

Color Enhancement Using an Absorber Layer Over a CSSP Layer

The CSSP emulsion of Example 14 is applied to a smooth substrate. An aluminum visible light absorber is applied over the coating by vacuum metallization. The metallized coating gives a distinct colored appearance.

Example 23

Color Enhancement of a Red Ink

Red inks were made by mixing a red-ink dispersion (Sun RFD, available from SunChemicals, Fort Lee, N.J.) with the CSSP emulsions of Examples 1, 2 and 6 at different ratios. The CSSP emulsions were optimized for different color-enhancement according to the teachings of this invention. The ink formulations are presented in Table 6. The blended ratios of emulsion to red-ink dispersion based on weight were 60:40, 60:20, and 60:10. The resulting inks were applied over a Leneta N2A card using a #32 wire-wound bar. Reflectance measurements were made using a ColorEye 7000 integrating sphere on the applied inks over both the white and black areas of the Leneta cards. Table 6 shows the trends of the a*b* (D65, 10°) results over the white region for the different inks in tabular format. The CSSP emulsion from Example 6, optimized for opacity, yields the worse red chromaticity, while the CSSP emulsions from Examples 1 and 2 yield a superior red that is either shifted to the yellow (Example 1) or blue (Example 2) relative to the other.

Example 24

Color Enhancement of a Yellow Ink

Yellow inks were made by mixing a yellow-ink dispersion (Sun YFD, available from Sun Chemical, Fort Lee, N.J.) and three CSSP emulsions from Examples 4, 6 and 14 at different ratios. The emulsions were optimized for different color-enhancement according to the teachings of this invention. The ink formulations are presented in Table 7. The blended ratios of emulsion to yellow ink dispersion on weight were 60:40 and 60:10. The resulting inks were applied over a Leneta N2A card using a #32 wire-wound bar. Reflectance measurements were made using a ColorEye 7000 integrating sphere on the applied inks over both the white and black areas of the Leneta cards. Table 7 shows the trends of the a*b* (D65, 10°) results over the white region for the different inks in tabular format. The CSSP emulsion from Example 14, optimized for yellow, yields the highest yellow chromaticity, whereas the CSSP emulsion from Example 4, optimized for the blue complement, yields an inferior yellow. The CSSP emulsion from Example 16 yields an intermediate yellow chromaticity.

Example 25

Color Enhancement of a Green Ink

A green ink dispersion was made by mixing a blue ink dispersion (Sun BFD, SunChemical, Fort Lee, N.J.) and a yellow ink dispersion (Sun YFD, Sun Chemical, Fort Lee, N.J.) at a 1:31 ratio based on weight. Green inks were made by combining the different CSSP emulsions (Examples 4, 5, and 9) with the green ink dispersions at a 60 to 20 ratio. These emulsions are optimized for different color-enhancement according to the teachings of this invention. The blending was done using impeller agitation. The resulting inks were applied to a Leneta N2A card using a #6 wire-wound bar. Reflectance measurements were made using a ColorEye 7000 integrating sphere. Table 8 shows the trends of the L a*b* (D65, 10°) results for the different inks. The CSSP emulsion of Example 9, optimized for green, yields the most negative a* value. The CSSP emulsion of Example 4, optimized for blue, was the most blue-shifted in appearance of the three inks.

Example 26

Pigmentless Colors: Hue Adjustment Through the Use of CSSPs in a Carbon Black Ink Emulsions made from CSSPs of differing particles sizes in the particle size range 173 nm<Dn<362 nm were blended in a 60:2 ratio by weight with a black ink dispersion (T150386, Wolstenholme International, Ltd., Lancashire, England). The blending was done using impeller agitation. The resulting inks were applied to a Leneta N2A card using a #12-wire-wound bar. A variety of colors (hues) were obtained, depending on the preferred scattering of light by the CSSPs. Reflectance measurements were made using a ColorEye 7000 integrating sphere. Table 9 shows the L a*b* results for the inks (26A-I) as well as the calculated chromo. A total variation of ~23 units in both the a* and b* values was achieved. The data is graphically displayed in FIG. 1. The approximate dependence of "dialed-in-color" with particle size (curved line) is shown. It is noted that the data forms a spiral pattern, and that more than one particle size may express a given color. For example, inks 26A and 26H both express blue color.

Example 27

The Use of a Tinted Black Ink as a Thermochromic Glass-Transition Indicator

Figure 2:
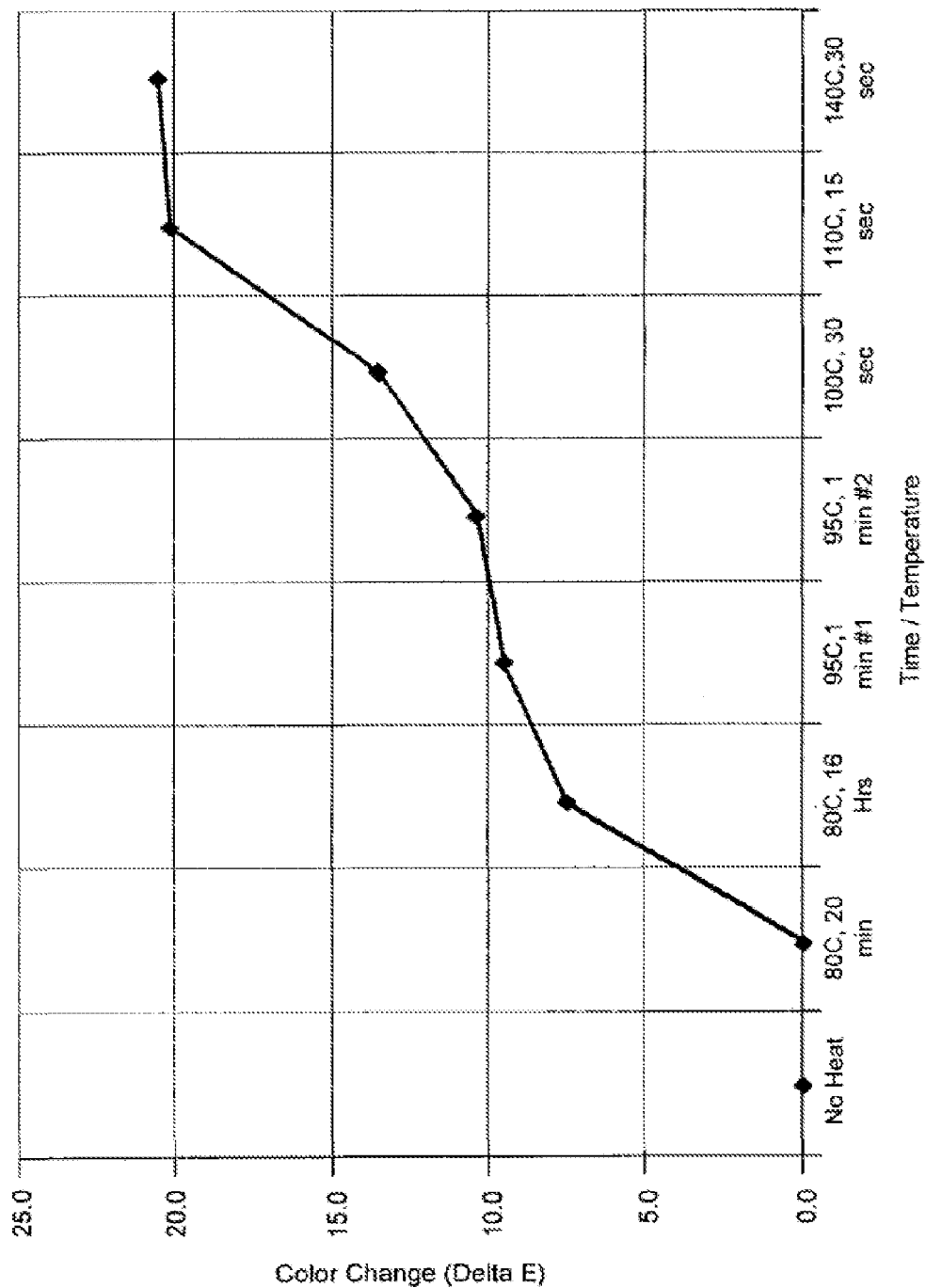
FIG. 2 shows a graph of $\Delta E$ as a function of time and temperature for one ink of Example 26.

Ink 26H was applied to Kraft paper using a #12 wire wound rod and cut into strips. The initial color/appearance was measured as L a*b*=40.82, −2.43, −11.43 using the ColorEye 7000. Strips with the applied ink were subjected to various heating conditions (time/temperature), removed from the oven, and re-measured for change in color. The results are tabulated in Table 10, and the A E values shown in FIG. 2. It is seen that a heat-treatment of 95° C. for 1 minute corresponds to approximately one half the possible total color change. The color change depends on both the temperature and heat application time.

Example 28

Color Development with Black Pigment in the Presence of Added Film-Former

Figure 3:
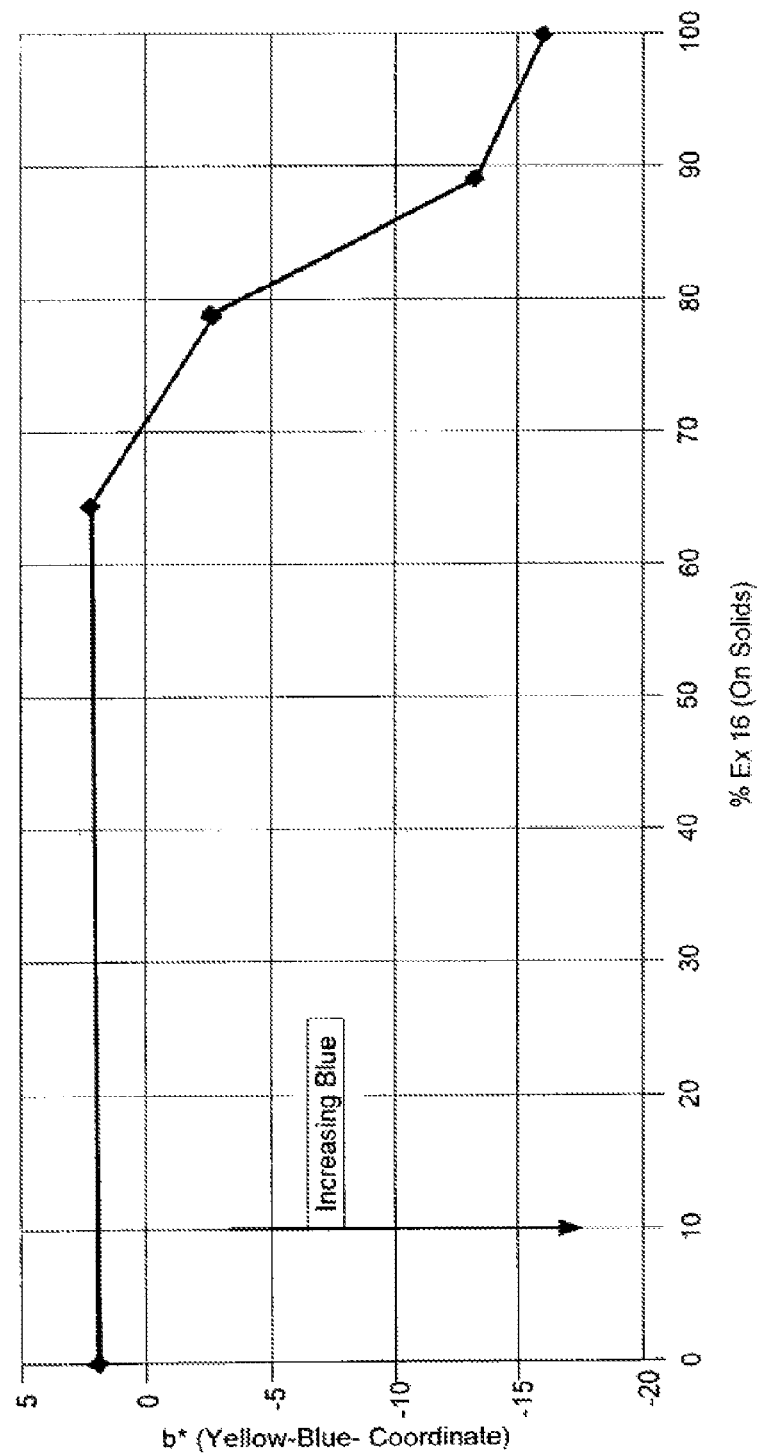
FIG. 3 shows a graph of the b* value versus % mass of CSSPs from Example 16A on a dry weight, or solids, basis.

The CSSP emulsion of Example 16A was used in combination with a black ink dispersion (at 1%, T150386, Wolstenholme International, Ltd., Lancashire, England) and a low-Tg film-forming emulsion JONCRYL 82, Johnson Polymer LLC, Sturtevant, Wis. 53177), at various ratios, to obtain a color enhancing composition. After mixing the given wet amounts in Table 11, the compositions were applied to white paper using a #12 wire-wound rod. The D65 L a*b* values were measured using the ColorEye 7000 instrument. A plot of the b* value versus % mass of CSSPs (Example 16A) on a dry weight, or solids, basis is given in FIG. 3. The results show that blue color development increases as the CSSP content in the composition increases.

Example 29

Color Enhancement of a Blue Ink

Blue inks with different levels of blue pigment dispersion (Sun BFD, Sun Chemical, Fort Lee, N.J.) were made with a CSSP emulsion optimized for blue (Example 4). For comparison, inks were also made with a CSSP emulsion not optimized for blue (Example 5). The inks were drawn down over a Lenetta N2A card with a #32 wire wound bar and dried. Two CSSP emulsions made without pigment were also drawn down in a similar manner. The L a*b* readings were measured with a MacBeth color eye instrument over the white portion of the Lenetta card. In all pigment dispersion/CSSP emulsion ratios, the inks made with the emulsion optimized for blue have better blue values (lower b*) than the corresponding inks using the emulsion not optimized for blue. Furthermore, the change in b* value is much larger than the corresponding change in blue for the emulsions without pigment, demonstrating the surprising effect of the pigment on the amount of color change. The formulations and results are tabulated in Table 12.

Example 30

Broad Particle Size Distribution Emulsion

An emulsion having a broad PSD and made from CSSPs having compositions identical to those of Example 8 was made by emulsion polymerization. Solids were approximately 52% and pH approximately 8.5. The particle size was measured by CHDF and found to be Dn=241, Dw=275.

Example 31

Effect of Pigment Content on Color Enhancement

Figure 4:
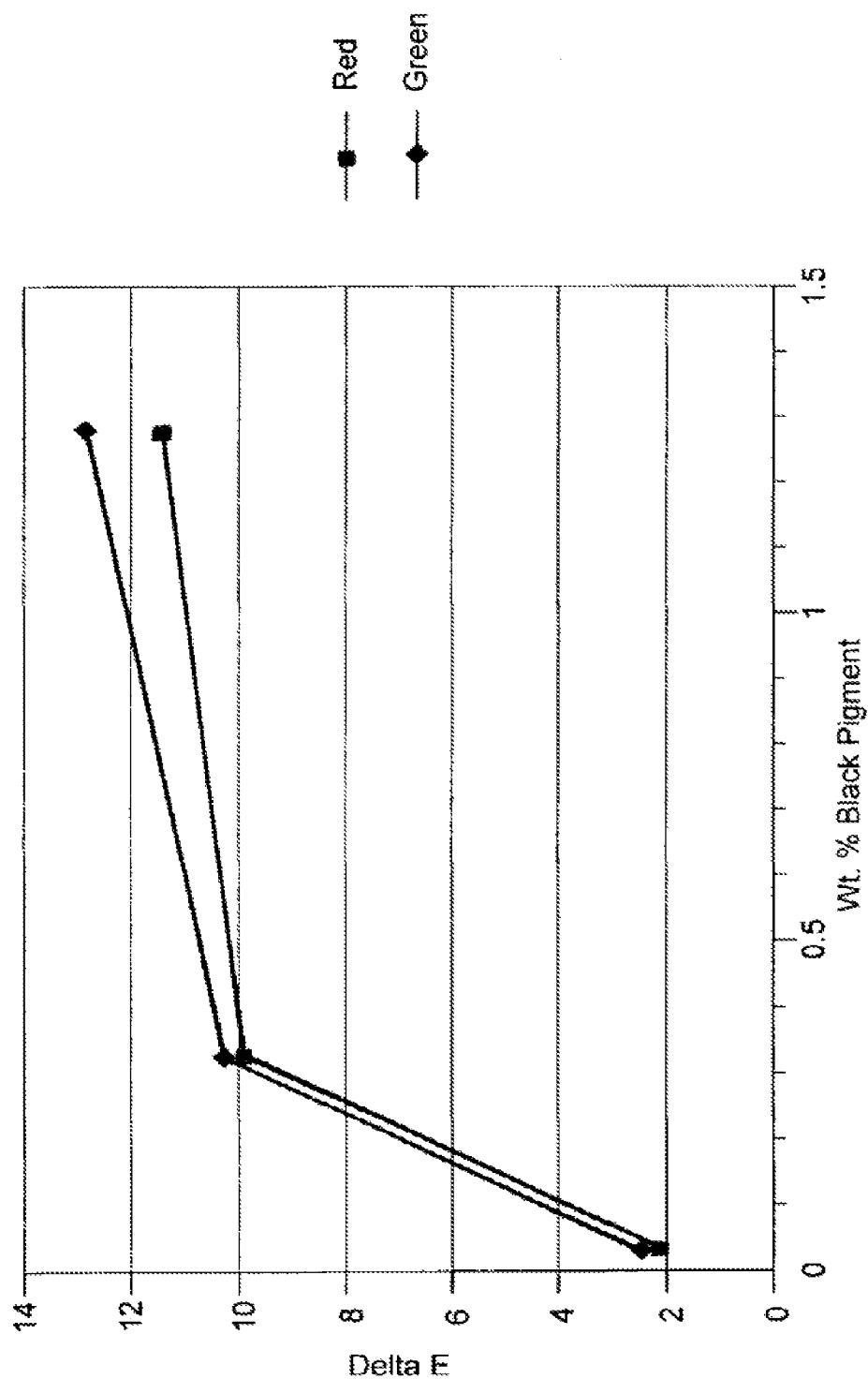
FIG. 4 shows a graph of $\Delta E$ as a function of black pigment content for the compositions of Example 31.

The narrow particle size CSSP emulsions from Examples 13 (red) and 16C (green) were blended with varying levels of black pigment. Identical levels of pigment were also blended with the CSSP emulsion from Example 30 in order to compute $\Delta E$ values. The coatings were drawn down over a Lenetta Card with a #12 rod. The L a*b* readings were measured with a MacBeth color eye instrument over the white portion of the Lenetta card. Chromo values were also calculated. The formulations and results are tabulated in Table 13. The $\Delta E$ data is shown in FIG. 4. According to the data in FIG. 4, approximately 0.2 weight % pigment is desirable.

Example 32

Effect of PSD of CSSPs on Color Enhancement

Figure 5:
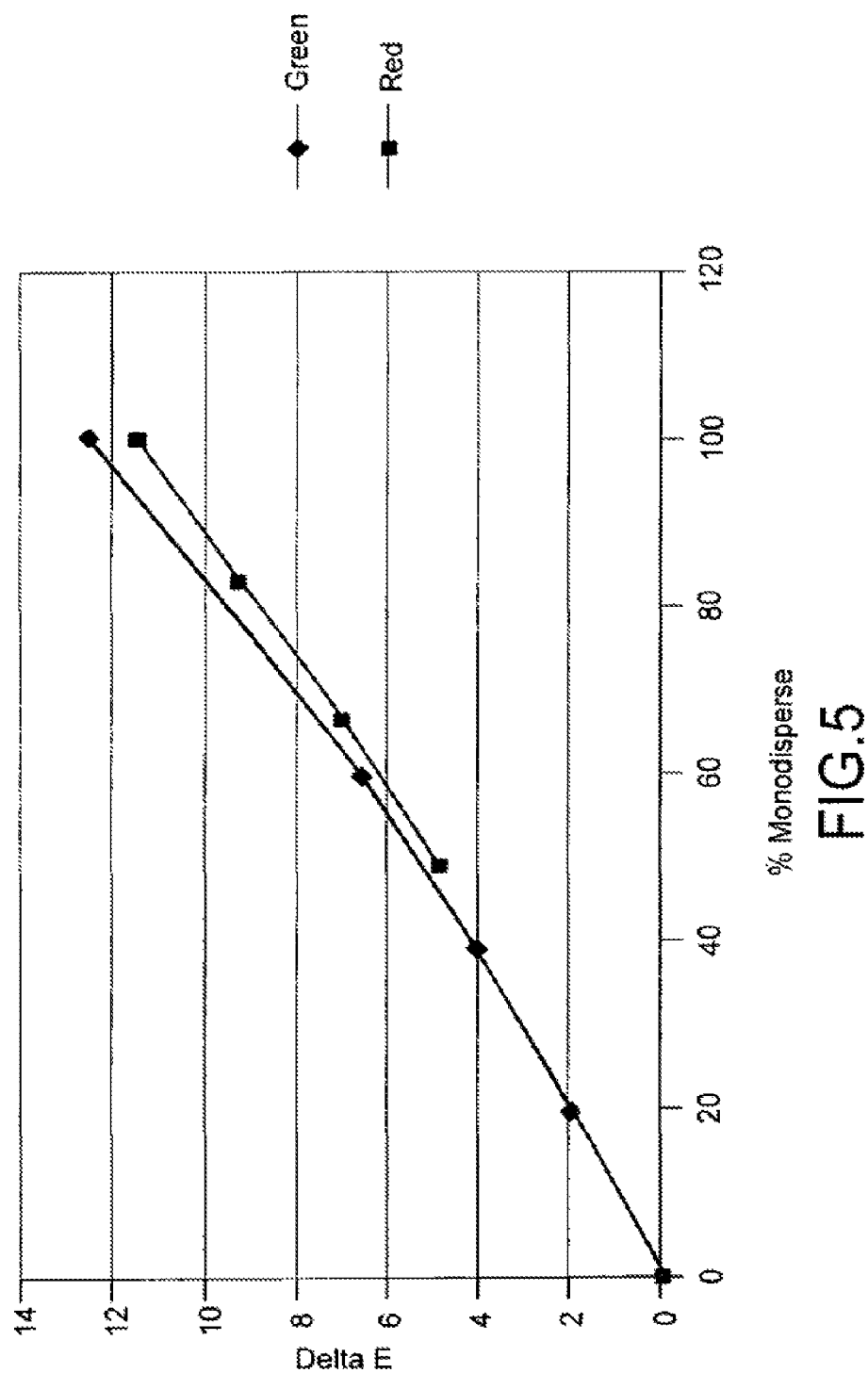
FIG. 5 shows a graph of $\Delta E$ as a function of percent monodispersity of CSSPs for the compositions of Example 32.
Figure 6:
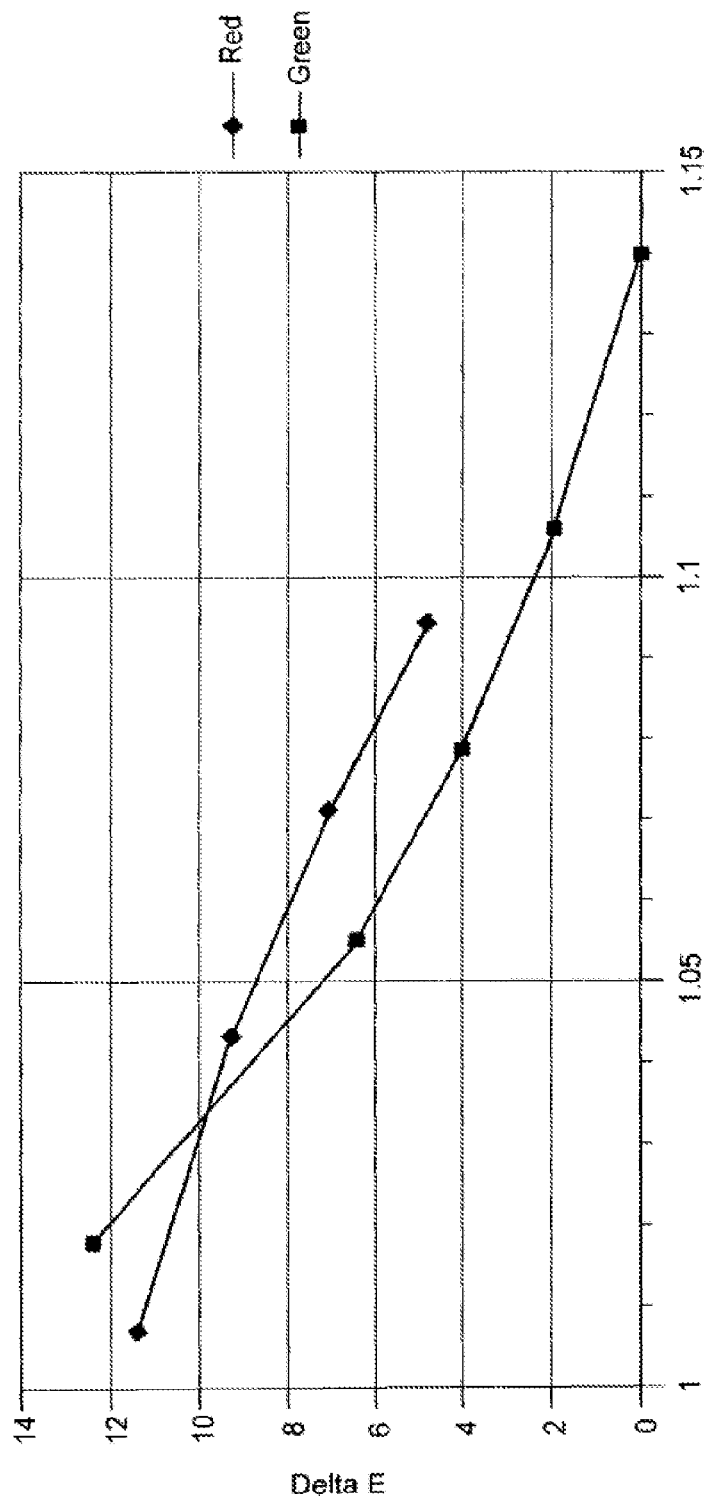
FIG. 6 shows a graph of $\Delta E$ as a function of Dw/Dn for the compositions of Example 32.

The substantially monodisperse CSSP emulsions from Examples 8 (green series), and 13 (red series) were blended with a black dispersion at a weight ratio of 60:2. The broad particle size distribution CSSP emulsion from Example 30 was also blended with the black dispersion at a weight ratio of 60:2. Blends of the resulting substantially monodisperse color enhancing compositions (Examples 32B and 32C) were made with the resulting broad particle size distribution color enhancing composition of Example 32A. The compositions were drawn down over a Leneta N2A Card with a #12 rod. The L a*b* readings were measured with a MacBeth color eye instrument over the white portion of the Lenetta card. The formulations, results and approximate Dw/Dn ratios are tabulated in Tables 14 and 15. FIGS. 5 and 6 graphically display the data. The data of FIG. 5 indicate that about 50% or more of the emulsion should be of a substantially monodisperse size to achieve $\Delta E$s of 5 or greater Alternatively, the Dw/Dn for the CSSPs should be less than about 1.1 to achieve $\Delta E$s of 5 or greater (FIG. 6).

Example 33

Polydisperse CSSPs Versus Substantially Monodisperse CSSPs

The polydisperse CSSP emulsion from Example 30 was used to make blue, yellow, and red inks. These were compared to the inks of Examples 29A, 24-A2 and 23-B3, which were prepared from substantially amonodisperse CSSP emulsions. The inks were made by mixing the emulsions with blue, yellow and red pigment dispersions from Flexiverse. The inks were drawn down over a Lenetta Card with a #32 wire wound rod. The L a*b* readings were measured with a MacBeth color eye instrument over the white portion of the Lenetta card, and the $\Delta E$s were calculated between the corresponding color pairs. In all cases inks made from the substantially monodisperse emulsions exhibited more intense colors. The data is provided in Table 16.

Example 34

Color Enhancement Using a CSSP Layer Over an Absorber Layer

A paper stock was partially coated with a black ink and dried. The L a*b* measurements over the coated black area and uncoated area were made with a MacBeth color eye instrument. CSSP emulsions from Examples 13, 14, 16A, 16C, and 30 were drawn down over both the black ink coated section and the uncoated section with both a #5 (thin coating) and a #12 (thick coating) wire wound bar. After drying, the L a*b* readings were measured with a MacBeth color eye instrument. $\Delta E$ calculations were made based on the difference between the substantially monodisperse CSSPs (Examples 34A1 through 34D4) and the corresponding polydisperse CSSPs (Examples 34E1 through 34E4). The results demonstrated that the absorber and CSSPs can be physically separated in the coating to achieve high $\Delta E$ values. The results demonstrated the importance of the absorber in achieving large $\Delta E$ values, and also demonstrated that in the two-layer coating the thickness of the top layer can have a large effect on the $\Delta E$ value. The data is given in Table 17.

Example 35

Obtaining Color Enhancement Using a Blend of Substantially Monodisperse CSSP Populations An ink was made using the CSSPs of Example 16A, which express blue color, and a black pigment dispersion. Another ink was made using the CSSPs of Example 4, which also express blue color and a black pigment dispersion. The CSSPs of Example 4 have larger particle sizes. A third ink was made by blending equal weights of these aforementioned inks. The three inks were drawn down over a Leneta N2A card with a #12 wire wound rod. After drying, the L a*b* readings were measured with a MacBeth color eye instrument. All three inks expressed blue color to a high degree. Table 18 shows the formulations and the results.

Example 36

Color Enhancement with Inorganic CSSPs

Silica particles are made via hydrolysis of tetraethyl orthosilicate in ethanol in the presence of ammonia, according to the methods of Stober (*J. of Colloid and Interf. Sci*. Vol 29, page 62-69, 1968). Narrow particle size distributions similar to those of the CSSPs of Examples 2, 9, 14, and 16A are obtained. Black pigment is added to the colloids at the weight ratio 30 silica particles/0.8 black pigment. When cast over a Leneta N2A card and dried so that there are air-filled voids between the particles, the coatings express red, green, yellow, and blue color respectively and generate significant chromo.

Example 37

Color Enhancement with Hollow Spheres CSSPs

A hollow sphere CSSP emulsion is made according to methods detailed in EP 1344803 A1 and EP 1092421 A2, the entire disclosures of which are incorporated herein by reference. The emulsion obtained has a void size of approximately 225 nm. Green pigment dispersion is blended with the emulsion in a 60:30 wet weight ratio. The resulting ink is drawn down over a white substrate with a #32 wire wound bar and dried. For comparison, broad PSD emulsion is blended with the green pigment dispersion at a weight ratio of 60:30. This is also drawn down over an identical white substrate with an #32 wire wound bar and dried, leaving no voids. Compared to the ink made from CSSPs with a broad particle size distribution and no voids, the hollow sphere CSSP-based dried ink has lower a* values (more green).

Example 38

Modification of the Thermochromic Properties of an Ink Using Styrene-Acrylic CSSPs with Different Glass Transition Temperatures This example demonstrates the relationship between the Tg of a CSSP and the thermochromic properties of an ink. Styrene-acrylic CSSPs were made as follows: 347.3 g of deionized water was added to a 3000 ml reactor and controlled at a temperature of 78° C. under agitation. A monomer mixture was made up in an agitated tank by blending 30.8 g methacrylic acid, 34.0 g hydroxyethyl acrylate, 325.6 g of deionized water, 14.0 g of a 75% solution of sodium dioctyl sulfosuccinate (Aerosol OT-75), 853 g styrene, and 162 g 2-ethylhexyl acrylate. From this monomer mixture, 142 g was taken and added to the reactor. 5.04 g of ammonium persulfate was dissolved in 20.2 g of deionized water, and this mixture was added to the reactor.

The reactor was maintained at 78° C. After 55 min. the remaining monomer mixture was fed to the reactor at a constant rate over 120 min. 17 g of deionized water was added to the monomer mixture tank and fed to the reactor. 20.0 g of a 70% solution of t-butyl hydroperoxide was blended with 2.5 g of deionized water, and this mixture was added to the reactor. 2.66 g of isoascorbic acid was dissolved in 21 g of deionized water and 3.2 g of 28% ammonia solution in water. This mixture was fed to the reactor over approximately 20 min. The reaction was cooled to 49° C. Then 7.8 g of a 50% sodium hydroxide solution in water was blended with 8.5 g of deionized water and added to the reactor. 0.4 g of a preservative containing approximately 15% 5-chloro-2-methyl-4-isothiazolin-3-one dissolved in water was blended with an additional 7.6 g of deionized water and added to the reactor. 4.0 g of an approximately 30% polyoxyalkylene polymer and 3% siloxane glycol copolymer (Dee Fo PI-35, made by ultra Additives, Paterson, N.J.) in water was added to the reactor. 40 g of a proprietary 18% solids styrene/acrylic/glycol/surfactant emulsion (AC-505, made by Aqueous Concepts, Tampa Fla.) was then added to the reactor. 33 g of deionized water was then added to the reactor.

The resulting emulsion had a non-volatile content of 55.2%, a pH of 8.53, and a viscosity of 435 cps as measured by a Brookfield type viscometer with spindle LV#2 at 30 rpm.

The resulting polymer had a Tg of 78° C. By comparison, the latex used for Example 27 had a Tg of 89° C. The polymer was blended in a 38:1 ratio by weight with a black ink dispersion (T150386, Wolstenholme International, Ltd., Lancashire, England).

Following the procedure described in Example 27, heat-treatment of 85° C. for 1 minute corresponds to approximately one half the total possible color change. By comparison, the indicator of Example 37 undergoes one-half its total possible color change at 95° C. and 1 minute. This example demonstrates that by changing the Tg of the latex, the temperature-time profile for the change in coating color can be adjusted.

Example 39

Monodisperse Crosslinked Styrene-Acrylic CSSPs with a Particle Size Distribution, (Dw/Dn), =323/322

This example provides a method for making substantially monodisperse styrene-acrylic CSSPs using an emulsion polymerization. 261 g of deionized water and 78 g of Example 7 was added to an agitated, temperature controlled 2000 ml. reactor. The reactor was heated to 78° C. A monomer mixture was made up in an agitated tank by blending 16.2 g methacrylic acid, 16.7 g hydroxyethyl acrylate, 165.2 g of deionized water, 7.0 g of a 75% solution of sodium dioctyl sulfosuccinate (Aerosol OT-75), 446 g styrene, 52.2 g 2-ethylhexyl acrylate, and 59.3 g ethylenedimethacrylate.

42 g of the monomer mixture made above was added to the reactor. 3.76 g of ammonium persulfate was dissolved in 67.5 g of deionized water, and this mixture was added to the reactor. The reactor was maintained at 78° C. After 15 minutes the remaining monomer mixture was fed to the reactor at a constant rate over 217 min. 1.53 g of a 70% solution of t-butyl hydroperoxide was blended with 16 g of deionized water, and this mixture was added to the reactor. 2.0 g of isoascorbic acid was dissolved in 12 g of deionized water and 2.5 g of 28% ammonia solution in water. This mixture was fed to the reactor over approximately 10 minutes. The reaction was cooled to 49° C. Then 5.0 g of 28% ammonia solution in water was blended with 5.0 g of deionized water and added to the reactor.

The resulting emulsion had a non-volatile content of 50.8%, a pH of 8.698, and a viscosity of 44 cps as measured by a Brookfield type viscometer with a spindle LV#1 at 30 rpm.

Example 40

High Tg Styrene-Acrylic CSSPs

This example provides a method for making styrene-acrylic CSSPs having a high glass transition temperature. De-ionized water (788.8 g.), 5.6 g of an alkyldiphenyloxide disulfonate salt solution (DowFax 2A1, Dow Chemical, Midland Mich.), 10.6 g of an anionic surfactant solution (Abex JKB, Rhodia Inc., Paris, France), were added to a 2000 ml reactor and heated with agitation. When a temperature of 85° C. was reached, 2.5 g of ammoniumpersulfate dissolved in 19.8 g of de-ionized water was added to the reactor and held 5 minutes. A mixture of 86.9 g of alphamethylstyrene, 200.8 g methacrylic acid, and 1.14 g of butylmercaptopropionate was then fed to the reactor over 64 minutes. The reaction was held at 85° C. for 30 minutes, then 150.2 g of de-ionized water was added. The above mixture (633 g) was poured into a separate 2000 ml reactor and cooled to 78° C. Then a mixture of 70.2 g of 28% ammonia in water and 21 g de-ionized water was added to this reactor. 0.71 g of ammonium persulfate dissolved in 7.73 g of de-ionized water was then added. The reaction was held at 85° C. for 30 minutes and then cooled. The resulting polymer had a weight average molecular weight of 16932 as measured with a Waters GPC instrument calibrated with polystyrene standards. The Tg was measured by DSC to have a Tg midpoint=176° C. The polymer dispersion had a solids content of 21.2 wt. %, a pH=8.66, and a viscosity=97 cps as measured by a Brookfield type viscometer with spindle LV#2 at 30 rpm.

Example 41

Heat Resistant Compositions

This example demonstrates the improvement in heat resistance that may be achieved for ink compositions that contain high Tg CSSPs, crosslinked CSSPs or a combination of high Tg and crosslinked CSSPs. The compositions in Table 19 were made and drawn down over unbleached kraft paper with a #2 wire wound bar and dried. With the exception of ink 41A, all of the ink compositions included high Tg CSSPs (from Example 40), crosslinked CSSPs (from Example 39), or a mixture of the two. Strips of the dried samples were tested for heat resistance, using a heat seal instrument (Model 12ASL11, from Sencorp Systems Inc., Hyannis, Mass.) operating at 40 psig, with a 0.5 second or a 5.5 second dwell, at various temperatures. The temperature at which the color of the strips begin changing to black are recorded in Table 19 also. This example demonstrates that heat resistant compositions can be achieved with the use of crosslinking and/or the addition of high Tg resin.

Tables

TABLE 1

Styrene-Acrylic CSSP Emulsions (Examples 8-16)

| | | Example # | | | | | | | | | | |
|---|---|---|---|---|---|---|---|---|---|---|---|---|
| | | 8 | 9 | 10 | 11 | 12 | 13 | 14 | 15 | 16A | 16B | 16C |
| A | DI Water | 131 | 118.5 | 133.7 | 133.5 | 136.5 | 137 | 119.9 | 133.6 | 135 | 135 | 135 |
| | Temperature | 78° C. | 78° C. | 78° C. | 78° C. | 81° C. | 74° C. | 78° C. | 78° C. | 78° C. | 78° C. | 78° C. |
| B | MAA | 11.7 | 10.5 | 11.4 | 11.4 | 12.2 | 12.2 | 10.4 | 11.6 | 11.5 | 11.5 | 11.5 |
| | HEA | 12.8 | 11.5 | 13.2 | 13.2 | 12.8 | 12.8 | 11.5 | 13.0 | 12.8 | 12.8 | 12.8 |
| | DI Water | 116 | 104 | 167 | 167 | 120 | 120 | 104 | 120 | 116 | 116 | 116 |
| | Aerosol OT-75 | 5.4 | 4.9 | 5.4 | 5.4 | 5.3 | 5.3 | 4.7 | 5.4 | 5.3 | 5.3 | 5.3 |
| | Styrene | 340 | 306 | 341 | 341 | 340 | 340 | 306 | 350 | 340 | 340 | 340 |
| | 2-EHA | 40 | 36 | 41 | 41 | 39.5 | 39.5 | 36.5 | 40.5 | 40.5 | 40.5 | 40.5 |
| C | Seed (Ex. 7) | 79 | 70 | 41 | 118 | 38 | 38 | 61 | 90 | 188 | 58 | 70 |
| D | APS | 1.65 | 1.7 | 1.9 | 1.9 | 1.98 | 1.95 | 1.72 | 1.93 | 1.89 | 1.89 | 1.89 |
| | DI Water | 10.4 | 32 | 33.2 | 33.2 | 35.4 | 34.7 | 32.6 | 33.6 | 37.7 | 37.7 | 37.7 |
| | Feedtime | 105 min | 100 min | 150 min | 120 min | 103 min. | 135 min. | 87 min. | 96 min. | 120 min. | 120 min. | 120 min. |
| E | DI Water | 8 | 7.2 | 8 | 8 | 8 | 8 | 7 | 8.3 | 8.0 | 8.0 | 8.0 |
| F | TBHP | 0.75 | 0.68 | 0.75 | 0.75 | 0.92 | 0.75 | 0.68 | 0.8 | 0.75 | 0.75 | 0.75 |
| | DI Water | 1.0 | 0.9 | 1.0 | 1.0 | 3.0 | 3.0 | 0.9 | 3.2 | 0.98 | 0.98 | 0.98 |
| G | Isoascorbic Acid | 1.0 | 0.9 | 1.0 | 1.0 | 1.0 | 1.1 | 0.9 | 1.0 | 1.00 | 1.00 | 1.00 |
| | DI Water | 4.0 | 3.0 | 3.4 | 3.4 | 4.4 | 4.1 | 3.0 | 4.0 | 3.38 | 3.38 | 3.38 |
| | Ammonium (28%) | 1.2 | 1.1 | 1.2 | 1.2 | 1.2 | 1.0 | 1.1 | 1.1 | 1.18 | 1.18 | 1.18 |
| H | NaOH (50%) | 2.9 | 2.6 | 2.9 | 2.9 | 3.0 | 3.0 | 2.6 | 2.9 | 2.93 | 2.93 | 2.93 |
| | DI Water | 3.0 | 2.7 | 3.0 | 3.0 | 4.0 | 5.0 | 2.7 | 3.0 | 3.0 | 3.0 | 3.0 |
| | Siloxane Emulsion | 1.50 | 1.35 | 1.50 | 1.50 | 1.50 | 1.50 | 1.35 | 1.50 | 1.5 | 1.5 | 1.5 |
| | AC-505 | 15.0 | 13.5 | 15.0 | 15.0 | 15.0 | 15.1 | 13.5 | 15.0 | 15.0 | 15.0 | 15.0 |
| I | Preservative | 0 | 0 | 0 | 0 | 0 | 0 | 0 | 0 | 0.15 | 0.15 | 0.15 |
| | DI Water | 0 | 0 | 0 | 0 | 0 | 0 | 0 | 0 | 2.85 | 2.85 | 2.85 |
| J | DI Water | 30 | 27 | 5 | 5 | 30 | 30 | 27 | 30 | 38.4 | 38.4 | 38.4 |

TABLE 2

Characteristics of CSSP Emulsion Properties

| | Example # | | | | | | | | | | |
|---|---|---|---|---|---|---|---|---|---|---|---|
| | 8 | 9 | 10 | 11 | 12 | 13 | 14 | 15 | 16a | 16b | 16c |
| Non-Volatile Components | 52.86 | 52.72 | 52.18 | 49.95 | 52.29 | 52.61 | 52.43 | 52.25 | 50.97 | 53.36 | 51.85 |

TABLE 2-continued

Characteristics of CSSP Emulsion Properties

| (wt. %) | 8 | 9 | 10 | 11 | 12 | 13 | 14 | 15 | 16a | 16b | 16c |
|---|---|---|---|---|---|---|---|---|---|---|---|
| pH | 8.72 | 8.37 | 8.45 | 8.51 | 8.55 | 8.27 | 8.30 | 8.29 | 7.63 | 7.85 | 7.83 |
| Viscosity (mPa) | 400 | 357 | 233 | 229 | 247 | 263 | 309 | 340 | 412 | 375 | 584 |
| PSD Dw/Dn | 229/225 | 235/230 | 292/290 | 208/202 | 294/292 | 296/294 | 247/242 | 226/220 | 180/173 | 252/248 | 234/229 |

TABLE 3

(Example 17)

| | 17A | 17B | 17C | 17D |
|---|---|---|---|---|
| Sun BFD 1121 | 10.16 | 10.10 | 10.00 | 10.08 |
| Example 4 Emulsion | 60.13 | — | 48.03 | — |
| Example 5 Emulsion | — | 60.08 | — | 48.01 |
| Low Tg Polymer | — | — | 12.00 | 12.08 |
| % Reflectance @460 nm | 46.7 | 42.3 | 38.2 | 33.7 |
| L | 41.8 | 42.7 | 38.7 | 37.6 |
| $a^*$ | −14.4 | −17.5 | −12.2 | −10.3 |
| $b^*$ | −47.4 | −41.2 | −42.2 | −38.6 |

TABLE 5

(Example 19)

| | 19A | 19B | 19C | 19D |
|---|---|---|---|---|
| Example 4 Emulsion | 60 | — | 60 | — |
| Example 5 Emulsion | — | 60 | — | 60 |
| Magruder LR6558 | 40 | 40 | — | — |
| Heucotech RS 1150 | — | — | 40 | 40 |
| % Reflectance @ 450 nm | 4.76 | 2.93 | 5.34 | 3.84 |

TABLE 6

(Example 23)

| | 23-A1 | 23-A2 | 23-A3 | 23-B1 | 23-B2 | 23-B3 | 23-C1 | 23-C2 | 23-C3 |
|---|---|---|---|---|---|---|---|---|---|
| Sun RFD | 10 | 20 | 40 | 10 | 20 | 40 | 10 | 20 | 40 |
| Example 6 Emulsion | 60 | 60 | 60 | | | | | | |
| Example 1 Emulsion | | | | 60 | 60 | 60 | | | |
| Example 2 Emulsion | | | | | | | 60 | 60 | 60 |
| Total Wt. | 70 | 80 | 100 | 70 | 80 | 100 | 70 | 80 | 100 |
| L | 41.6 | 35.2 | 30.7 | 40.1 | 33.1 | 28.3 | 39.4 | 33.2 | 28.5 |
| $a^*$ | 49.1 | 43.6 | 34.8 | 57.4 | 53.7 | 43.9 | 57.2 | 53.0 | 42.7 |
| $b^*$ | 2.5 | 9.3 | 15.2 | 2.7 | 3.6 | 13.7 | −4.5 | 1.9 | 7.8 |

TABLE 4

(Example 18)

| | 18A | 18B | 18C |
|---|---|---|---|
| Sun BFD 1121 | 40.11 | 33.0 | 29.0 |
| Example 5 Emulsion | 59.98 | — | — |
| Example 3 Emulsion | — | 66.1 | 69.6 |
| Black Pigment (Wolstenholme T-150-386) | — | 0.90 | 1.40 |
| L | 27.4 | 24.1 | 24.0 |
| $a^*$ | −2.1 | −3.3 | −4.9 |
| $b^*$ | −29.6 | −29.4 | −27.2 |
| Approximate % Dollar Savings | — | 5 | 9 |

TABLE 7

(Example 24)

| | 24-A1 | 24-A2 | 24-B1 | 24-B2 | 24-C1 | 24-C2 |
|---|---|---|---|---|---|---|
| Sun YFD | 10 | 40 | 10 | 40 | 10 | 40 |
| Example 14 Emulsion | 60 | 60 | | | | |
| Example 6 Emulsion | | | 60 | 60 | | |
| Example 4 Emulsion | | | | | 60 | 60 |
| Total Wt. | 70 | 100 | 70 | 100 | 70 | 100 |

TABLE 7-continued (Example 24)

| | Example # | | | | | |
|---|---|---|---|---|---|---|
| | 24-A1 | 24-A2 | 24-B1 | 24-B2 | 24-C1 | 24-C2 |
| L | 86.4 | 82.5 | 87.0 | 82.5 | 87.2 | 82.7 |
| a* | 1.5 | 9.7 | 2.0 | 10.5 | 2.4 | 10.5 |
| b* | 100.1 | 104.2 | 96.4 | 99.1 | 90.9 | 97.3 |

TABLE 8

(Example 25)

| | Example # | | |
|---|---|---|---|
| | 25A | 25B | 25C |
| Sun YFD | 15 | 15 | 15 |
| Sun BFD 1121 | 5 | 5 | 5 |
| Example 4 Emulsion | | | 60 |
| Example 5 Emulsion | | 60 | |
| Example 9 Emulsion | 60 | | |
| Total Wt. | 80 | 80 | 80 |
| L | 41.6 | 42.1 | 41.4 |
| a* | −47.3 | −44.7 | −44.3 |
| b* | 29.6 | 25.5 | 19.7 |

TABLE 9

(Example 26)

| Example # | Emulsion | Approx. Dn | L | a* | b* | Chromo |
|---|---|---|---|---|---|---|
| 26A | Example 16A | 173 | 27.8 | 0.86 | −16.38 | 16.40 |
| 26B | — | 204 | 36.3 | −9.67 | −8.22 | 12.69 |
| 26C | Example 15 | 220 | 38.5 | −12.36 | 0.15 | 12.36 |
| 26D | Example 16C | 229 | 39.2 | −10.6 | 6.00 | 12.19 |
| 26E | Example 14 | 242 | 40.8 | −6.7 | 6.91 | 9.62 |
| 26F | Example 16B | 248 | 40.2 | −2.35 | 6.44 | 6.86 |

TABLE 9-continued (Example 26)

| Example # | Emulsion | Approx. Dn | L | a* | b* | Chromo |
|---|---|---|---|---|---|---|
| 26G | Example 13 | 294 | 37.8 | 9.38 | −8.24 | 12.48 |
| 26H | Example 3 | 328 | 39.5 | −2.22 | −11.37 | 11.58 |
| 26I | Example 6 | 362 | 43.1 | −5.39 | −0.57 | 5.42 |

TABLE 10

(Example 27)

| Conditions | L | a* | b* | ΔE | % Color Change |
|---|---|---|---|---|---|
| No Heat | 40.82 | −2.43 | −11.43 | 0.00 | 0.0 |
| 80° C., 20 min. | 40.7 | −2.4 | −11.4 | 0.13 | 0.7 |
| 80° C., 16 hrs. | 35.55 | −3.09 | −6.13 | 7.51 | 37.1 |
| 95° C., 1 min. #1 | 33.96 | −3.08 | −4.62 | 9.69 | 47.9 |
| 95° C., 1 min. #2 | 33.81 | −2.63 | −3.66 | 10.47 | 51.8 |
| 100° C., 30 sec. | 30.45 | −2.29 | −2.59 | 13.63 | 67.4 |
| 110° C., 15 sec. | 25.20 | 0.59 | 0.72 | 20.02 | 99.0 |
| 140° C., 30 sec. | 25.56 | 2.18 | 1.02 | 20.23 | 100.0 |

TABLE 11

(Example 28)

| | Example # | | | |
|---|---|---|---|---|
| | 28A | 28B | 28C | 28D |
| Example 16A Emulsion (51% polymer) | 10.0 | 10.0 | 10.0 | 10.0 |
| Low Tg Emulsion (40% polymer) | 0.15 | 1.5 | 3.5 | 7.1 |
| Black Ink Dispersion | 0.1 | 0.1 | 0.1 | 0.1 |
| % Example 16A Emulsion (Based on Polymer Solids) | 99 | 89 | 78 | 64 |
| L | 43.3 | 42.8 | 53.6 | 40.9 |
| a* | 0.9 | −0.2 | 0.7 | 0.6 |
| b* | −16.3 | −13.8 | −2.8 | 1.8 |

TABLE 12

(Example 29)

| | Example # | | | | | | | |
|---|---|---|---|---|---|---|---|---|
| | 4 | 5 | 29A | 29B | 29C | 29D | 29E | 29F |
| Sun BFD 1121 | | | 40.07 | 40.05 | 29.99 | 30.12 | 20.53 | 20.09 |
| Example 4 Emulsion | 100 | | 60.15 | | 60.07 | | 60.26 | |
| Example 5 Emulsion | | 100 | | 60.05 | | 60.08 | | 60.06 |
| L | 96.4 | 96.4 | 26.2 | 26.4 | 28.4 | 29.2 | 32.9 | 33.7 |
| a* | −0.13 | −0.20 | 0.55 | −0.42 | −2.70 | −4.6 | −7.1 | −9.8 |
| b* | −0.51 | −0.08 | −35.19 | −26.2 | −37.9 | −31.4 | −42.7 | −36.5 |
| Δb | −0.43 | | −9.0 | | −6.5 | | −6.2 | |

TABLE 13

(Example 31)

| Example # | Emulsion | Wt. %. Black Pigment | L | a* | b* | Δ E | Chromo |
|---|---|---|---|---|---|---|---|
| 31A | Ex. 30 | 0.012903 | 38.40 | −1.70 | −3.30 | | 3.72 |
| 31B | Ex. 30 | 0.003226 | 59.18 | −1.06 | −3.19 | | 3.36 |
| 31C | Ex. 30 | 0.000323 | 86.16 | −0.04 | 0.54 | | 0.55 |
| 31D | Ex. 13 | 0.012903 | 37.02 | 8.71 | −7.86 | 11.455 | 11.74 |

TABLE 13-continued (Example 31)

| Example # | Emulsion | Wt. %. Black Pigment | L | a* | b* | Δ E | Chromo |
|---|---|---|---|---|---|---|---|
| 31E | Ex. 13 | 0.003226 | 57.66 | 8.04 | -6.61 | 9.833 | 10.41 |
| 31F | Ex. 13 | 0.000323 | 85.53 | 1.82 | -0.46 | 2.200 | 1.87 |
| 31G | Ex. 16C | 0.012903 | 39.32 | -10.63 | 5.99 | 12.917 | 12.20 |
| 31H | Ex. 16C | 0.003226 | 57.83 | -9.11 | 2.96 | 10.219 | 9.57 |
| 31I | Ex. 16C | 0.000323 | 84.55 | -1.49 | 1.65 | 2.438 | 2.23 |
| 31J | Ex. 16C | 0.0065 | 48.50 | -10.93 | 4.04 | | 11.65 |
| 31K | Ex. 16C | 0.0250 | 28.83 | -7.01 | 6.41 | | 9.50 |
| 31L | Ex. 16C | 0.0013 | 70.91 | -4.24 | 2.97 | | 5.18 |
| 31M | Ex. 16C | 0.0006 | 78.04 | -2.94 | 2.18 | | 3.66 |

TABLE 14

(Example 32)

| Example # | Emulsion | Wt. % Black Pigment | L | a* | b* | Δ E | Dw/Dn |
|---|---|---|---|---|---|---|---|
| 32A | Ex. 30 | 0.013 | 38.459 | -1.716 | -3.4 | | 1.141 |
| 32B | Ex. 8 | 0.013 | 38.825 | -11.879 | 3.709 | 12.41 | 1.018 |
| 32C | Ex. 13 | 0.013 | 36.968 | 8.685 | -7.847 | 11.41 | 1.007 |

TABLE 15

(Example 32)

| Example # | Wt. % Ex. 32A | Wt. % Ex. 32B | Wt. % Ex. 32C | L | a* | b* | Δ E | Approx. Dw/Dn |
|---|---|---|---|---|---|---|---|---|
| 32D | 80 | 20 | | 38.449 | -3.178 | -2.248 | 1.86 | 1.108 |
| 32E | 60 | 40 | | 38.665 | -4.98 | -1.061 | 4.02 | 1.080 |
| 32 F | 40 | 60 | | 38.767 | -7.071 | 0.343 | 6.54 | 1.056 |
| 32 F | 50 | | 50 | 37.902 | 2.808 | -4.977 | 4.82 | 1.096 |
| 32 F | 33 | | 67 | 38.029 | 4.852 | -5.968 | 7.06 | 1.072 |
| 32 F | 17 | | 83 | 37.364 | 6.887 | -6.792 | 9.31 | 1.043 |

TABLE 16

(Example 33)

| Example # | Wt. % Ex. 30 | Wt. % Flexiverse YFD1123 | Wt. % Flexiverse RFD4247 | Wt. % Flexiverse BFD1121 | L | a* | b* | Δ E |
|---|---|---|---|---|---|---|---|---|
| 33A | 60 | 40 | | | 82.699 | 10.16 | 101.7 | |
| 33B | 60 | | 40 | | 29.139 | 39.465 | 11.27 | |
| 33C | 60 | | | 40 | 24.68 | 4.70 | -28.14 | |
| 29A | | | | | 26.2 | 0.55 | -35.19 | 8.32 |
| 24A2 | | | | | 82.512 | 9.703 | 104.249 | 2.58 |
| 23B3 | | | | | 28.29 | 43.93 | 13.74 | 5.17 |

TABLE 17

(Example 34)

| Example # | Emulsion | Rod | L | a* | b* | Δ E |
|---|---|---|---|---|---|---|
| Uncoated | | | 94.668 | -0.497 | 1.02 | |
| Coated with Black Ink | | | 29.058 | 0.357 | 1.303 | |

TABLE 17-continued (Example 34)

| Example # | Emulsion | Rod | L | a* | b* | ΔE |
|---|---|---|---|---|---|---|
| Ex 34A1 Over Black Ink | Ex. 13 | #5 | 69.562 | 8.58 | −14.411 | 16.16 |
| Ex 34 A2 Over Black Ink | Ex. 13 | #32 | 90.607 | 2.808 | −4.502 | 5.17 |
| Ex 34 A3 Over Uncoated Area | Ex. 13 | #5 | 94.87 | −0.669 | 0.558 | 0.49 |
| Ex 34 A4 Over Uncoated Area | Ex. 13 | #32 | 96.093 | −0.044 | −0.284 | 0.54 |
| Ex 34B1 Over Black Ink | Ex. 14 | #5 | 68.241 | −14.206 | −5.21 | 14.60 |
| Ex 34B2 Over Black Ink | Ex. 14 | #32 | 90.138 | −6.671 | −2.803 | 4.77 |
| Ex 34 B3 Over Uncoated Area | Ex. 14 | #5 | 94.185 | −0.763 | −0.407 | 0.96 |
| Ex 34 B4 Over Uncoated Area | Ex. 14 | #32 | 95.573 | −1.297 | −0.674 | 0.88 |
| Ex 34C1 Over Black Ink | Ex. 16a | #5 | 68.531 | −16.785 | −8.401 | 15.48 |
| Ex 34C2 Over Black Ink | Ex. 16a | #32 | 90.401 | −7.04 | −4.235 | 4.82 |
| Ex 34 C3 Over Uncoated Area | Ex. 16a | #5 | 94.215 | −0.396 | −0.273 | 0.84 |
| Ex 34 C4 Over Uncoated Area | Ex. 16a | #32 | 95.341 | −1.047 | −1.166 | 1.07 |
| Ex 34 D1 Over Black Ink | Ex. 16c | #5 | 51.581 | 0.764 | −26.61 | 31.36 |
| Ex 34 D2 Over Black Ink | Ex. 16c | #32 | 78.831 | −3.68 | −16.589 | 17.54 |
| Ex 34 D3 Over Uncoated Area | Ex. 16c | #5 | 93.943 | −0.396 | 0.879 | 1.28 |
| Ex 34 D4 Over Uncoated Area | Ex. 16c | #32 | 94.503 | −0.153 | −0.431 | 1.52 |
| Ex 34 E1 Over Black Ink | Ex. 30 | #5 | 77.945 | −4.678 | −10.523 | |
| Ex 34 E2 Over Black Ink | Ex. 30 | #32 | 91.301 | −2.309 | −4.336 | |
| Ex 34 E3 Over Uncoated Area | Ex. 30 | #5 | 94.96 | −0.518 | 0.104 | |
| Ex 34 E4 Over Uncoated Area | Ex. 30 | #32 | 95.976 | −0.539 | −0.475 | |

TABLE 18

(Example 35)

| | Example # | | |
|---|---|---|---|
| | 35A | 35B | 35C |
| Black Ink Dispersion | 2.00 | 1.00 | |
| Example 4 Emulsion | 60.00 | | |
| Example 16A Emulsion | | 54.0 | |
| Low Tg Emulsion | | 6.0 | |
| Example 35A | | | 50 |
| Example 35B | | | 50 |
| Approximate Dw/Dn | 1.00 | 1.04 | 1.11 |
| L | 38.2 | 41.5 | 38.0 |
| a* | −2.37 | −1.22 | −0.77 |
| b* | −10.81 | −13.54 | −11.26 |
| Chromo | 11.1 | 13.6 | 11.3 |

TABLE 19

(Example 41)

| Example # | 41A | 41B | 41C | 41D | 41E | 41F |
|---|---|---|---|---|---|---|
| Black Ink Dispersion | 1.70 | 1.73 | 1.70 | 1.70 | 1.68 | 1.40 |
| Example 40 High Tg Emulsion | | 14.12 | | 14.16 | 28.37 | 28.32 |
| Deionized Water | | 3.02 | | | 3.04 | |
| Example 5 Emulsion | 60.0 | 49.15 | | | 43.63 | |
| Example 39 Crosslinked CSSP Emulsion | | | 60.08 | 53.20 | | 47.29 |
| Approximate Temperature To Change Color with 5.5 Second Dwell (° F.) | 193 | 210 | 220 | 220 | 360 | 400 |
| Approximate Temperature to Change Color with 0.5 Second Dwell (° F.) | 210 | 230 | 240 | 250 | 400 | 450 |

What is claimed is:

1. A method comprising:
applying a color enhancing composition to a substrate; and
drying the color enhancing composition;
wherein:
the color enhancing composition comprises:
a carrier fluid;
chromatically selective scattering particles having a particle size distribution as measured by (weight average diameter)/(number average diameter) of less than or equal to 1.1; and
an absorber of visible light.

2. The method of claim 1, wherein the substrate comprises paper, recycled paper, or paperboard.

3. The method of claim 2, wherein applying the color enhancing composition comprises applying the chromatically selective scattering particles and the absorber in separate layers.

4. The method of claim 1, wherein:
the substrate comprises an indicia;
the drying forms a dried color enhancing composition having one or more scattering properties concealing the indicia; and
a color of the dried color enhancing composition matches a color of the indicia.

5. The method of claim 4 further comprising changing the one or more scattering properties of the dried color enhancing composition to reveal the indicia.

6. The method of claim 5, wherein changing the one or more scattering properties of the dried color enhancing composition comprises, at least partially, coalescing the chromatically selective scattering particles.

7. The method of claim 5, wherein changing the scattering properties of the dried color enhancing composition comprises filling voids between the chromatically selective scattering particles with a medium having a refractive index that differs from a refractive index of the chromatically selective scattering particles by no more than about 1.1.

8. The method of claim 7 further comprising removing the medium from the voids to re-conceal the indicia.

9. A method for enhancing the color of a material, the method comprising:
  adding a color enhancing composition to the material;
  wherein the color enhancing composition comprises:
    a carrier fluid;
    chromatically selective scattering particles having a particle size distribution as measured by (weight average diameter)/(number average diameter) of less than or equal to 1.1; and
    an absorber of visible light.

10. The method of claim 9, wherein the material is a printing ink, a coating or a paint.

* * * * *